(12) United States Patent
Lin et al.

(10) Patent No.: US 7,859,970 B2
(45) Date of Patent: Dec. 28, 2010

(54) HOLOGRAPHIC STORAGE AND REPRODUCTION SYSTEM AND METHOD WITH SERVO

(75) Inventors: Chih-Ming Lin, Hsinchu (TW); Chen-I Kuo, Hsinchu (TW); Yung-Sung Lan, Hsinchu (TW); Tzuan-Ren Jeng, Hsinchu (TW); Feng-Hsiang Lo, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 1115 days.

(21) Appl. No.: 11/481,082

(22) Filed: Jul. 6, 2006

(65) Prior Publication Data

US 2007/0140091 A1  Jun. 21, 2007

(30) Foreign Application Priority Data

Dec. 21, 2005  (TW) .............................. 94145584 A

(51) Int. Cl.
 *G11B 7/09* (2006.01)
 *G11B 7/00* (2006.01)
(52) U.S. Cl. ................. 369/103; 369/44.38; 369/53.19; 369/53.28; 359/22
(58) Field of Classification Search ................ 369/103, 369/111, 112.16–112.22, 112.28–112.29, 369/275.1–275.4, 44.24, 44.26–44.33, 44.35–44.38, 369/47.38, 47.44–47.46, 53.12–53.14, 53.19, 369/53.22–53.23, 53.25, 53.28; 359/1–35
See application file for complete search history.

(56) References Cited

U.S. PATENT DOCUMENTS

| | | | |
|---|---|---|---|
| 6,700,686 B2 | 3/2004 | King et al. | |
| 6,721,076 B2 | 4/2004 | King et al. | |
| 6,909,529 B2 | 6/2005 | Curtis | |
| 2003/0025955 A1 | 2/2003 | Curtis | |
| 2003/0039001 A1 | 2/2003 | King et al. | |
| 2003/0072045 A1 | 4/2003 | King et al. | |
| 2004/0184122 A1* | 9/2004 | Tsukagoshi | 359/35 |
| 2004/0212859 A1* | 10/2004 | Tsukagoshi | 369/103 |
| 2005/0002311 A1* | 1/2005 | Ichihara et al. | 369/103 |
| 2006/0114792 A1* | 6/2006 | Uno et al. | 369/103 |
| 2006/0171284 A1* | 8/2006 | Matsumoto et al. | 369/103 |

FOREIGN PATENT DOCUMENTS

| | | |
|---|---|---|
| JP | 2005-293630 A | 10/2005 |
| TW | 464794 | 11/2001 |
| WO | WO-2005/098829 A1 | 10/2005 |
| WO | WO-2005/109117 A1 | 11/2005 |

* cited by examiner

*Primary Examiner*—Wayne R Young
*Assistant Examiner*—Nathan A Danielsen
(74) *Attorney, Agent, or Firm*—Rabin & Berdo, P.C.

(57) ABSTRACT

A holographic storage and reproduction system and method with a servo are provided, wherein a servo mechanism is provided, such that the holographic interferogram is continuously stored in the holographic recording medium. When a reproduced signal is to be obtained, it can be retrieved quickly and accurately through the servo mechanism. Also, the intensity distribution of the reference light reflected by the holographic recording medium can be monitored and controlled, such that the relative distance and oblique angle between the storage and reproduction system and the holographic recording medium are analyzed and adjusted.

18 Claims, 23 Drawing Sheets

HOLOGRAPHIC STORAGE AND REPRODUCTION SYSTEM AND METHOD WITH SERVO

CROSS-REFERENCE TO RELATED APPLICATIONS

This non-provisional application claims priority under 35 U.S.C. §119(a) on Patent Application No(s). 094145584 filed in Taiwan, R.O.C. on Dec. 21, 2005, the entire contents of which are hereby incorporated by reference.

BACKGROUND OF THE INVENTION

1. Field of Invention

The present invention relates to a holographic storage and reproduction system and method, and more particularly, to a holographic storage and reproduction system and method with a servo function.

2. Related Art

In the current optical storage media market, the capacity of a commercialized blue-ray disc rarely exceeds 100 GBytes, so various possible recording techniques for ultra high capacity are widely being developed, wherein the holographic optical disc has the greatest potential. The holographic recording technique has been developed for a long time, but it cannot be applied to a consumer optical storage product due to many factors. For example, early holographic experiments required a huge laser source with a high power of more than hundreds of milliwatts, a complex optical system, and a ponderous anti-vibration table, and moreover a photo-refractive crystal typically used as a holographic recording medium which is much more expensive than other ordinary media. However, along with the progress of the technique and new ideas, the limits placed on the holographic storage recording technique have been removed one by one. For example, a miniaturized high power laser, a high sensitive recording material, and a small-scale data access optical system with a position servo function have already been developed, and the conventional thought that a recording medium should be rewritable has been broken by consumer behavior in the optical disc market. Nowadays, it is still difficult for recording material of rewritable photo-refractive crystal to satisfy conditions such as a good material property, high data security, and cheap price. Illuminated by the popularization of single-write multi-read CD-R/DVD-Rs and other ordinary optical discs, the cognition that a holographic recording medium can be made of material other than rewritable material has become widely accepted. If the rewrite function is not taken into consideration, many cheap and highly sensitive organic materials can be used as the data-recording layer of a holographic optical disc, such as photopolymers. Photopolymers may generate a chemical reaction similar to molecular bonding under an irridation of strong recording light, and therefore, three-dimensional holographic interference fringes of data can be recorded and a data reproduction can be carried out through the change of optical properties caused by the molecular bonding density distribution. The concept of the aforementioned small-scale data access optical system with a position servo function is derived from a servo mechanism of the CD/DVD optical disc driver, and it is a critical factor for the holographic optical disc to be practical.

A holographic storage technique, as described in U.S. Patent Gazette Publications NO. 20040212859 and NO. 6700686, is applicable in a transmissive holographic recording medium. Due to a transmissive design, an image sensor is disposed at the opposite side of the holographic recording medium, such that the whole volume of the system becomes larger. Generally, in such transmissive system architecture design, the optical axis of the objective lens through which the signal beam passes is selected to be perpendicular to the holographic recording medium, and the reference light should be incident to the holographic recording medium in an oblique direction. Thus, a deviation is easily caused for a relative position and direction between the reference light and the holographic recording medium. Once the deviation is generated, when the reference light cannot be incident to the holographic recording medium along an original path, no reproduced signal light will be formed; thus the reproduced signal light cannot be captured by adjusting the signal light path, the image sensor for receiving reproduced optical signals will obtain no reproduced optical signal, and of course no correctly reproduced data can be reverted by an image processing technique. For a static holographic recording medium, if such an architecture enables the reference light to make a small scale scan on direction and position, the reproduced optical signal can be obtained, however, for a continuously moving holographic recording medium, the reproduced optical signal is still hard to be obtained.

Another related technique, as described in U.S. Patent Gazette Publications No. 6721076 and No. 6909529, provides an optical architecture applicable in a reflective holographic recording medium, however, no specific servo method is provided.

SUMMARY OF THE INVENTION

In view of above problems, a main object of the present invention is to provide a holographic storage and reproduction system and method with a servo, for storing and retrieving data conveniently and quickly by providing a servo mechanism, and developing a corresponding mechanical architecture.

To achieve the above object, the present invention discloses a holographic storage and reproduction system with a servo, which comprises a holographic recording medium, used as a medium for storing optical signals; a light source, which can generate a signal light and a reference light, wherein the reference light is incident to the holographic recording medium along a first incidence direction; a spatial light modulator (SLM) located in a signal light path, for making the signal light be incident to the holographic recording medium along a second incidence direction after it is incident to the SLM, to be made to interfere with the reference light, thereby generating a holographic interferogram in the holographic recording medium.

When the reference light is incident to the holographic interferogram along the first incidence direction again, a conjugate reproduced light is generated and is incident to an image sensor along the signal light path.

Furthermore, a feedback control is used in the system, to ensure that the reference light is incident to the holographic recording medium along the first incidence direction, and the holographic recorded interference is continuously recorded in the holographic recording medium. A servo light guiding portion is used for guiding the reference light to a sensing portion after being reflected by the holographic recording medium, such that the intensity distribution of the reference light after being reflected by the holographic recording medium is converted to an electrical signal and transmitted to the control device, for adjusting the reference light to be incident to the holographic recording medium along the first incidence direction. A servo light source is further used for generating a servo light. The servo light is incident to a servo track of the holographic recording medium via the servo light guiding portion, and is reflected by the servo track. Then the servo light is propagated to the sensing portion via the servo light guiding portion, and received and then transmitted to the control device by the sensing portion, thereby the holographic interferogram can be continuously recorded in the holographic recording medium along the servo track sequentially.

A first light guiding portion and a second light guiding portion are further provided. The first light guiding portion is disposed in front of the light source, such that the light generated by the light source is split into a signal light and a reference light after passing through the first light guiding portion. The first light guiding portion makes the reference light be incident to the holographic recording medium along the first incidence direction. The second light guiding portion guides the signal light to be incident to the holographic recording medium along the second incidence direction, after it is incident to the SLM, thereby, the signal light and the reference light are made to interfere with one another in the holographic recording medium to generate a holographic interferogram.

Furthermore, the present invention provides a holographic optical storage and reproduction method with a servo. After a signal light and a reference light are generated, the reference light is incident to the holographic recording medium along the first incidence direction, and the signal light is modulated and diverted to be incident to the holographic recording medium along the second incidence direction. Therefore, the signal light and the reference light are made to interfere with one another to generate a holographic interferogram. Then a servo light is generated and diverted to be incident to a servo track of the holographic recording medium. After being reflected and modulated by the servo track, the servo light is received again, thereby the holographic interferogram can be continuously recorded in the holographic recording medium along the servo track sequentially.

Furthermore, after the step of diverting the signal light to be incident to the holographic recording medium along the second incidence direction and interfered with the reference light, thereby producing a holographic interferogram, it further comprises reflecting the reference light to the sensing portion, for adjusting the reference light to be incident to the holographic recording medium along the first incidence direction.

Another holographic optical storage and reproduction method with a servo is provided. After a signal light and a reference light are generated, the reference light and the signal light are incident to the holographic recording medium in parallel along the first incidence direction. Then the signal light is modulated, and the signal light and the reference light are diverted, such that the signal light and the reference light appear as convergent beams, to be incident to the holographic recording medium and made to interfere with one another, thereby generating a holographic interferogram. A servo light is generated and diverted to be incident to a servo track of the holographic recording medium, and after being reflected and modulated by the servo track, the servo light is received, thereby the holographic interferogram is continuously recorded in the holographic recording medium along the servo track.

Furthermore, after the step of diverting the signal light and the reference light, such that the signal light and the reference light appear as convergent beams, to be incident to the holographic recording medium and made to interfere with one another, thereby generating the holographic interferogram, it further comprises reflecting the reference light to the sensing portion, for adjusting the reference light to be incident to the holographic recording medium along the first incidence direction.

Therefore, the present invention provides a holographic storage and reproduction system with a servo. The holographic storage and reproduction system together with the servo mechanism enables the reference light to be incident to the holographic recording medium along the first incidence direction, and the holographic interferogram to be continuously recorded in the holographic recording medium along the servo track. Thus, several optical architectures are provided to achieve the object. Moreover, this architecture can use a holographic multiplexing mechanism, thereby further raising the capacity of the holographic recording medium.

The features and practices of the present invention will be described in detail by preferred embodiments with accompanying drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only, and which thus is not limitative of the present invention, and wherein.

DETAILED DESCRIPTION OF THE INVENTION

Figure 2A:
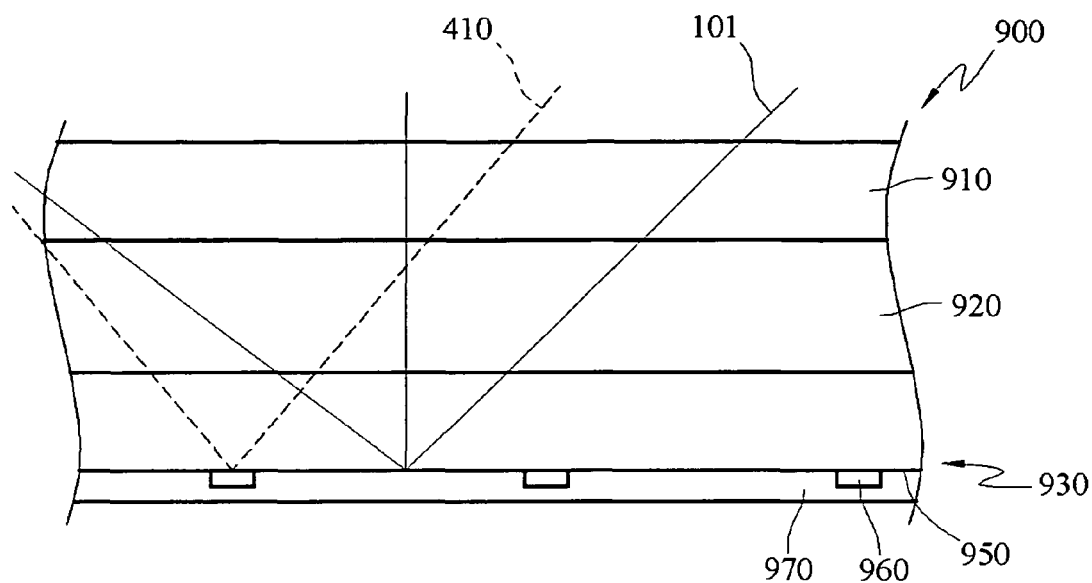
FIG. 2A is a schematic view of the reference light and the servo light incident to the holographic recording medium according to the present invention.
Figure 2B:
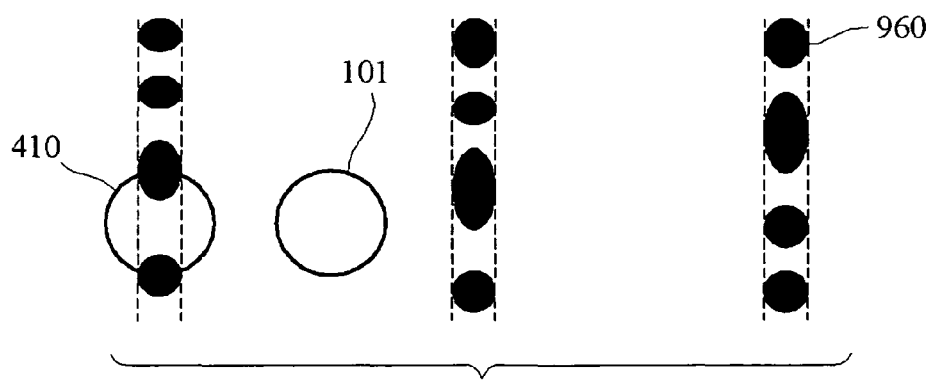
FIG. 2B is a schematic view of a servo track of the holographic recording medium according to the present invention.

A holographic interferogram 800 is to be stored in a holographic recording medium 900. The holographic recording medium 900 comprises a first substrate 910 and a second substrate 930. A recording layer 920 is sandwiched between the first substrate 910 and the second substrate 930, wherein the recording layer 920 can record an optical signal, such as the holographic interferogram 800. The second substrate 930 comprises a protective layer 970 and a reflective layer 950, wherein the reflective layer 950 is located on the protective layer 970. A servo track 960 is further disposed in the reflective layer 950, wherein the servo track 960 consists of a plurality of recesses or bumps; alternatively, other servo tracks, such as the conventional CD/DVD disc, are used. When a beam is incident to the servo track 960, it is modulated by the servo track 960. When a servo light 410 is reflected, it can be known that the beam is located in a certain position of the holographic recording medium 900, as shown in FIGS. 2A and 2B. However, the holographic interferogram 800 should be generated by an optical system. Several optical systems capable of generating the holographic interferogram 800 are illustrated below.

Figure 1A:
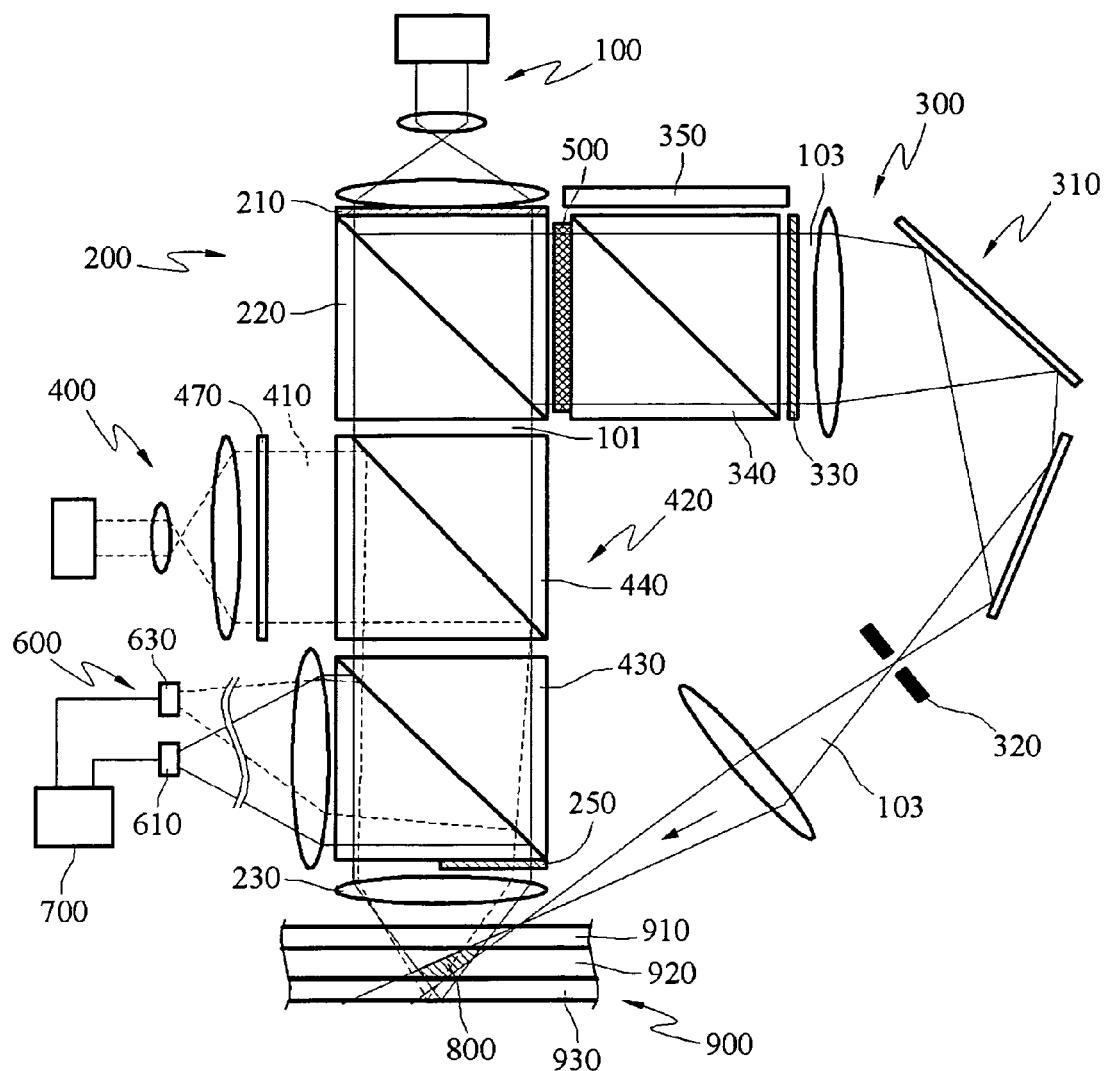
FIG. 1A is an architural view according to a first embodiment of the present invention.

Referring to FIG. 1A, it is an architectural view according to a first embodiment of the present invention. A light source 100 can emit a coherence light. The coherence light is split into a reference light 101 and a signal light 103 after passing through a first light guiding portion 200. The reference light 101 is guided by the first light guiding portion 200 to be incident to the holographic recording medium 900 along a first incidence direction, wherein the first incidence direction is a direction perpendicular to the holographic recording medium 900 in this embodiment. The signal light 103 is incident to a spatial light modulator (SLM) 500 after being splitted by the first light guiding portion 200, such that the signal light 103 is guided by a second light guiding portion 300 to be incident to the holographic recording medium 900 along a second incidence direction after being modulated by the SLM 500. The polarization state of the signal light 103 is the same as that of the reference light 101, and therefore, when the reference light 101 and the signal light 103 are made to interfere with one another in the recording layer 920 of the holographic recording medium 900, a holographic interferogram 800 is generated, which is stored in the recording layer 920 of the holographic recording medium 900.

When the reference light 101 is incident to the holographic interferogram 800 along the first direction again, a reproduced light 105 is generated by the reference light 101. The reproduced light 105 is incident to a two-dimensional image sensor 350 along the path of the signal light 103, and then is unscrambled.

A servo light guiding portion 420 is used, such that the reference light 101 is guided to a sensing portion 600 after being reflected by the reflective layer 950 of the holographic recording medium 900, thereby the reference light 101 is converted to an electrical signal and transmitted to the control device 700. Then the control device 700 can analyze and adjust a relative distance and oblique angle between the storage and reproduction system and the holographic recording medium 900. Furthermore, a servo light source 400 is used to produce a servo light 410, which is incident to the servo track 960 of the holographic recording medium 900 via a servo light guiding portion 420. Then, the servo light 410 is modulated and reflected by the servo track 960, and received by the sensing portion 600. Therefore, the reference light 101 is incident to the holographic recording medium 900 along the first direction, and the holographic interferogram 800 can be recorded on the recording layer 920 of the holographic recording medium 900 along the servo track 960 sequentially.

The first light guiding portion 200 is used to split the light generated by the light source 100 into the signal light 103 and the reference light 101, and guide the reference light 101 to be incident to the holographic recording medium 900 along the first direction. A polarization plate 210 is disposed in front of the light source 100, to select a light of a particular polarization, i.e. a linear polarized light, from the light generated by the light source 100. The linear polarized light is adjusted to a particular polarization direction parallel to the paper, which is referred to as a P polarization. If the polarization state is a particular polarization direction perpendicular to the paper, it is referred to as an S polarization. After passing through the polarization plate 210, the light of the light source 100 becomes a linear polarized light in a P polarization state. The linear polarized light is split into two lights via a beam splitter 220, i.e. the signal light 103 and the reference light 101, which both are in a P polarization state.

The second light guiding portion 300 is used to guide the signal light 103 passing through the SLM 500 to be incident to the holographic recording medium 900 along the second incidence direction. A lens and a reflective mirror set 310 is used, such that the propagation direction of the signal light 103 is changed via the lens and the reflective mirror set 310, and the signal light 103 is incident to the holographic recording medium 900 along the second incidence direction. A pin hole 320 is disposed between the lens and the reflective mirror set 310, to filter the stray light from the signal light 103 and the reproduced light 105. Therefore, the reference light 101 and the signal light 103 are incident to the recording layer 920 of the holographic recording medium 900 along the first incidence direction and the second incidence direction respectively, under the guidance of the first light guiding portion 200 and the second light guiding portion 300. The polarization states of the reference light 101 and the signal light 103 are made to be consistent by the first light guiding portion 200 and the second light guiding portion 300, therefore, the reference light 101 and the signal light 103 are made to interfere with one another to generate the holographic interferogram 800, which is stored in the recording layer 920.

Furthermore, an objective lens 230 is further disposed in the first light guiding portion 200, such that the reference light 101 appears as a convergent beam to be focused in the reflective layer 950 of the holographic recording medium 900, and thus the reference light 101 can be reflected from the reflective layer 950 along the original path.

Figure 1B:
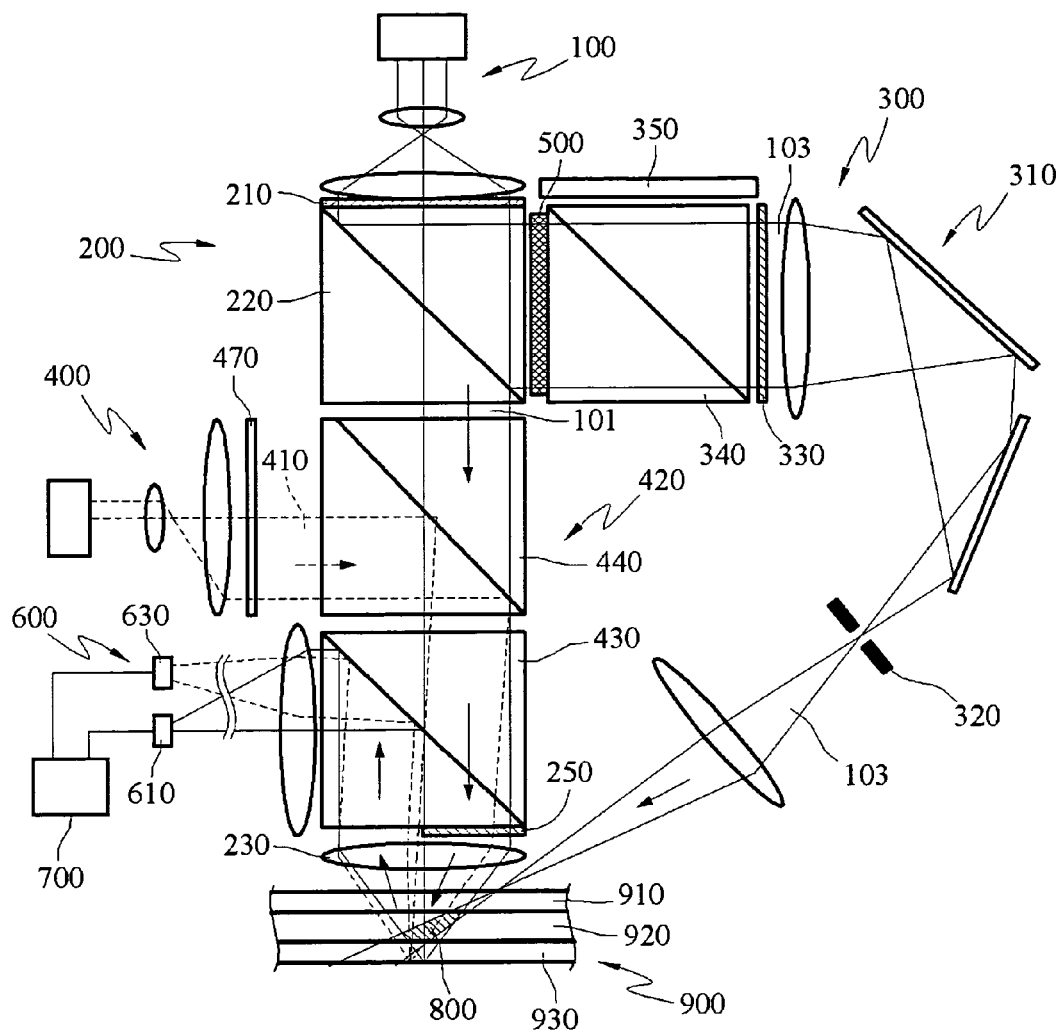
FIG. 1B is a schematic view of a recording state according to the first embodiment of the present invention.

In order to make the travel path of the reference light 101 when in a reproducing state be opposite to that of the reference light 101 when recording, such that when the reference light 101 in reproduction passes through the holographic interferogram 800 of the recording layer 920, a conjugate reproduced light 105 is generated, which is propagated along the original path of the signal light 103. To obtain the conjugate reproduced light 105, a first phase retardation plate 250 is added in the first light guiding portion 200, and a second phase retardation plate 330 is added in the second light guiding portion 300. The first phase retardation plate 250 is disposed at one side of the beam splitter 220, such that when a part of the reference light 101 is incident to the first phase retardation plate 250, its polarization state is changed to S polarization, and it is referred to as a right reference light 101, and a part of reference light 101 which does not pass through the first phase retardation plate 250 maintains its polarization state at P polarization, and it is referred to as a left reference light 101. The second phase retardation plate 330 of the second light guiding portion 300 is disposed in the path of the signal light 103. After it is incident to the SLM 500, then the signal light 103 is incident to the second phase retardation plate 330, such as a ½λ wave plate, therefore, the polarization state of the signal light 103 can be changed to S polarization. The polarization state of the part of the right reference light 101 passing through the first phase retardation plate 250 is also S polarization, and when it is incident to the reflective layer 950 of the holographic recording medium 900, it will be reflected off the holographic recording medium 900 towards a reflection direction. However, as the signal light 103 is incident to the holographic recording medium 900 along the second incidence direction, the signal light 103 and the right reference light 101 are intersected and made to interfere with one another, thereby generating the holographic interferogram 800, which is stored in the recording layer 920 of the holographic recording medium 900, as shown in FIG. 1B.

Figure 1C:
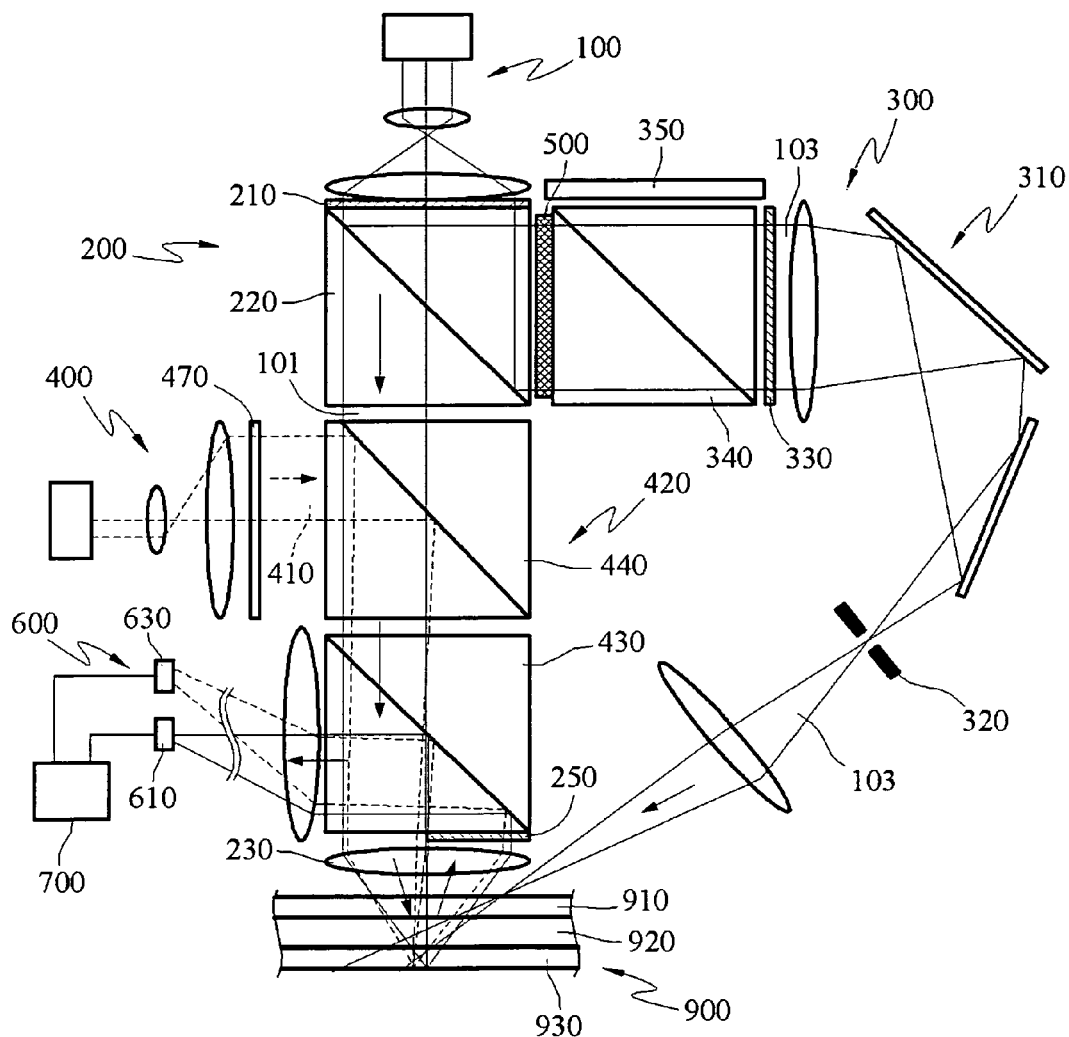
FIG. 1C is a schematic view of a left reference light without being interfered with a signal light according to the first embodiment of the present invention.

The left reference light 101 which does not pass through the first phase retardation plate 250 maintains the polarization state at P polarization. And similarly, when the left reference light is incident to the reflective layer 950 of the holographic recording medium 900, it will also be reflected off the holographic recording medium 900 towards a reflection direction. The signal light 103 is still incident to the holographic recording medium 900 along the second incidence direction, and the signal light 103 and the left reference light 101 are made to intersect with one another, however, the polarization state of the left reference light 101 is P polarization while the polarization state of the signal light 103 is S polarization, and the two polarization states are perpendicular to each other, therefore no interference will be generated, as shown in FIG. 1C.

Figure 1D:
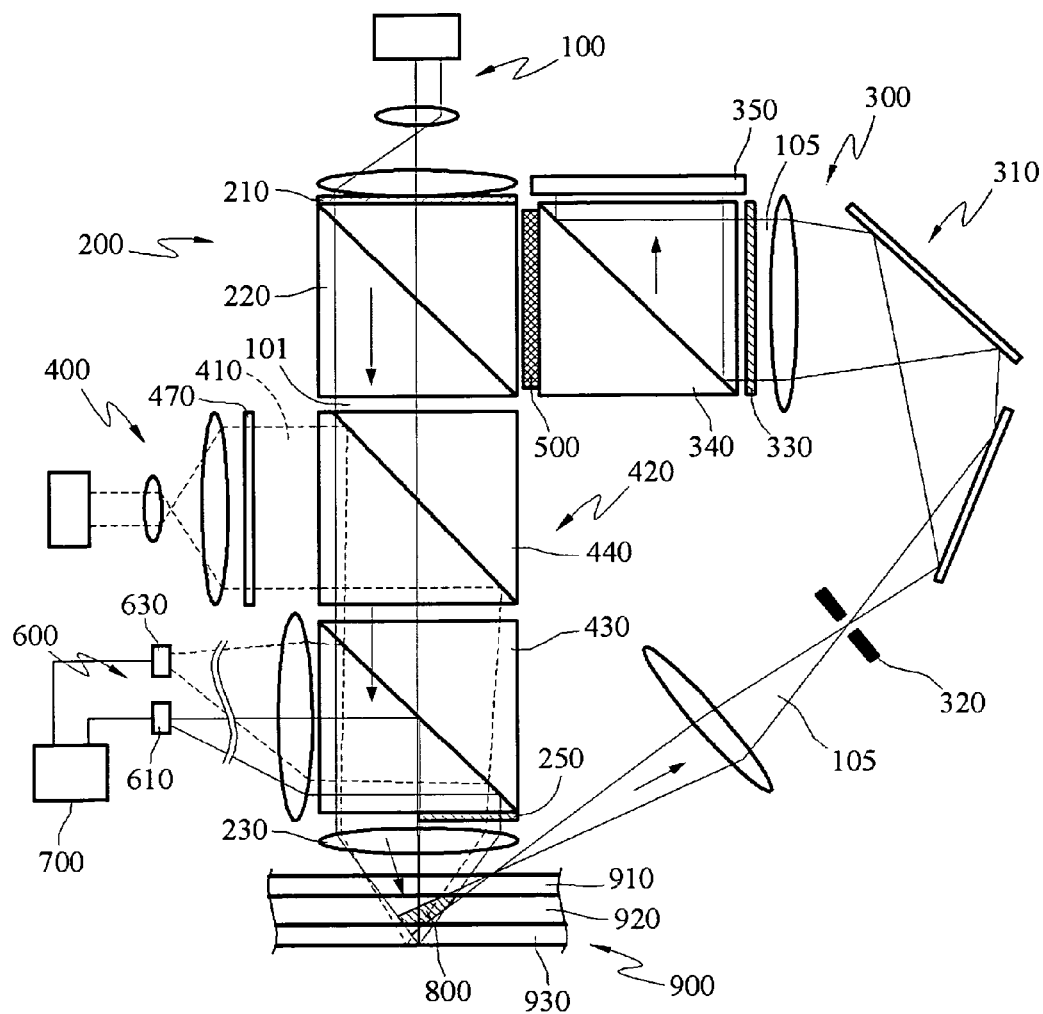
FIG. 1D is a schematic view of a reproducing state according to the first embodiment of the present invention.

When reproduction is to be performed, when the left reference light 101 which does not pass through the first phase retardation plate 250 is incident to the holographic recording medium 900, it passes through the holographic interferogram 800 and the reflective layer 950, and the left reference light 101 is reflected by the reflective layer 950 to pass through the holographic interferogram 800 towards the reflection direction again, and leaves the holographic recording medium 900. The travel path of the left reference light 101 is opposite to that of the right reference light 10 when recording, therefore a conjugate reproduced light 105 is generated, which returns along the original path of the signal light 103. As the conjugate reproduced light 105 is generated by the left reference light 101 incident to the holographic interferogram 800, the polarization state of the conjugate reproduced light 105 is also P polarization. Therefore, when the conjugate reproduced light 105 returns along the original path of the signal light 103, it passes through the second phase retardation plate 330, and its polarization state is changed to S polarization. When the conjugate reproduced light 105 is incident to the first polarization beam splitter 340, as its polarization state is S polarization, it is reflected by the first polarization beam splitter 340. A two-dimensional image sensor 350 is disposed at one side of the first polarization beam splitter 340 in the reflection direction of the conjugate reproduced light 105, to receive and analyze the conjugate reproduced light 105, as shown in FIG. 1D.

Furthermore, to endow the system with a feedback control, a servo light source 400 and a servo light guiding portion 420 are used. The servo light source 400 can generate a servo light 410, wherein the wavelength of the servo light 410 is different from the wavelengths of the signal light 103 and the reference light 101. The servo light guiding portion 420 comprises a second polarizationpolarization beam splitter 430 and a dichroic prism 440. The second polarization beam splitter 430 is disposed between the beam splitter 220 and the first phase retardation plate 250, such that the left reference light 101 which does not pass through the first phase retardation plate 250 is incident to the first phase retardation plate 250 to change its polarization state to S polarization, after being reflected by the reflective layer 950 of the holographic recording medium 900, and the left reference light 101 is reflected and diverted to be incident to a reference light sensor 610 of a sensing portion 600 when it is incident to the second polarizationpolarization beam splitter 430, thereby the left reference light 101 is converted to an electrical signal and transmitted to a control device 700. When the right reference light 101 passing through the first phase retardation plate 250 is incident to and reflected by the reflective layer 950 of the holographic recording medium 900, it is directly incident to the second polarization beam splitter 430. As the polarization state of the right reference light 101 is changed to S polarization when passing through the first phase retardation plate 250, it is also reflected and diverted by the second polarization beam splitter 430 to be incident to the reference light sensor 610 of the sensing portion 600. Either the left reference or the right reference light 101 will be reflected by the second polarization beam splitter 430 to be incident to the reference light sensor 610 of the sensing portion 600, and be transmitted to the control device 700. Therefore, the control device 700 can analyze and adjust the relative distance and oblique angle between the storage and reproduction system and the holographic recording medium 900.

The dichroic prism 440 is used to separate the light with different wavelengths, thus the reference light 101 can pass through the dichroic prism 440 without being influenced. However, when the servo light 410 is incident to the dichroic prism 440, it cannot pass through the dichroic prism 440 but is reflected completely. Therefore, the dichroic prism 440 is disposed between the beam splitter 220 and the second polarization beam splitter 430, and the servo light source 400 is disposed at one side of the dichroic prism 440. When the servo light 410 generated by the servo light source 400 is incident to the dichroic prism 440, it is reflected and diverted to be incident to a servo track 960 of the holographic recording medium 900. Before it is incident to the holographic recording medium 900, the servo light 410 passes through the second polarization beam splitter 430, such that only the servo light 410 with a polarization state of P polarization is allowed to pass through. A part of the servo light 410 with the polarization state of P polarization will pass through the first phase retardation plate 250 to change its polarization state to S polarization, and is referred to as a right servo light 410, and a part of servo light 410 which does not pass through the first phase retardation plate 250 maintains the polarization state at P polarization, and is referred to as a left servo light 410. After it is incident to the servo track 960 of the holographic recording medium 900, the right servo light 410 is reflected by the servo track 960 off the holographic recording medium 900, and is incident to the second polarization beam splitter 430. As the polarization state of the right servo light 410 is S polarization, it is reflected and diverted by the second polarization beam splitter 430 to be incident to the servo light sensor 630 of the sensing portion 600. The left servo light 410 does not pass through the first phase retardation plate and is incident to the servo track 960 of the holographic recording medium 900, and it is also reflected by the servo track 960 off the holographic recording medium 900. After the left servo light 410 passes through the first phase retardation plate 250, its polarization state is changed to S polarization, such that the left servo light 410 is reflected and diverted to be incident to the servo light sensor 630 of the sensing portion 600 when it is incident to the second polarization beam splitter 430. Therefore, either the left servo or the right servo light 410 will be reflected by the second polarization beam splitter 430 to be incident to the servo light sensor 630 of the sensing portion 600, for detecting a signal of the servo light 410 modulated by the servo track 960; thereby the servo light 410 is converted to an electrical signal and transmitted to the control device 700, for controlling the reference light 101 to be incident to the holographic recording medium 900 along the first incidence direction, and on the other hand, for moving the optical architecture or the holographic recording medium 900 such that the holographic interferogram 800 is recorded in the recording layer 920 of the holographic recording medium 900 along the servo track 960 sequentially, as shown in FIGS. 1A and 1B.

Furthermore, to prevent the servo track 960 and the focus point of the reference light 101 from being overlapped and causing scattering of the reference light 101 such that it is unable to be reflected to be propagated to the reference light sensor 610 of the sensing portion 600, the servo track 960 is separated from the focus point of the reference light 101 by a small distance. However, to make the servo light 410 be focused at the servo track 960, when the servo light 410 is incident to the dichroic prism 440 and is reflected, the servo light 410 is made to be incident to the holographic recording medium 900 in a slightly oblique angle. Therefore, when the servo light 410 is focused by the objective lens 230, it will not be focused on the center axis of the objective lens 230, but will be focused on the servo track 960 seperated from the center axis of the objective lens 230 by a small distance, and then the servo light 410 is modulated and reflected by the servo track 960, as shown in FIG. 1A.

In this embodiment, the SLM 500 is a transmissive SLM 500, such as a transmissive liquid crystal panel.

Figure 4A:
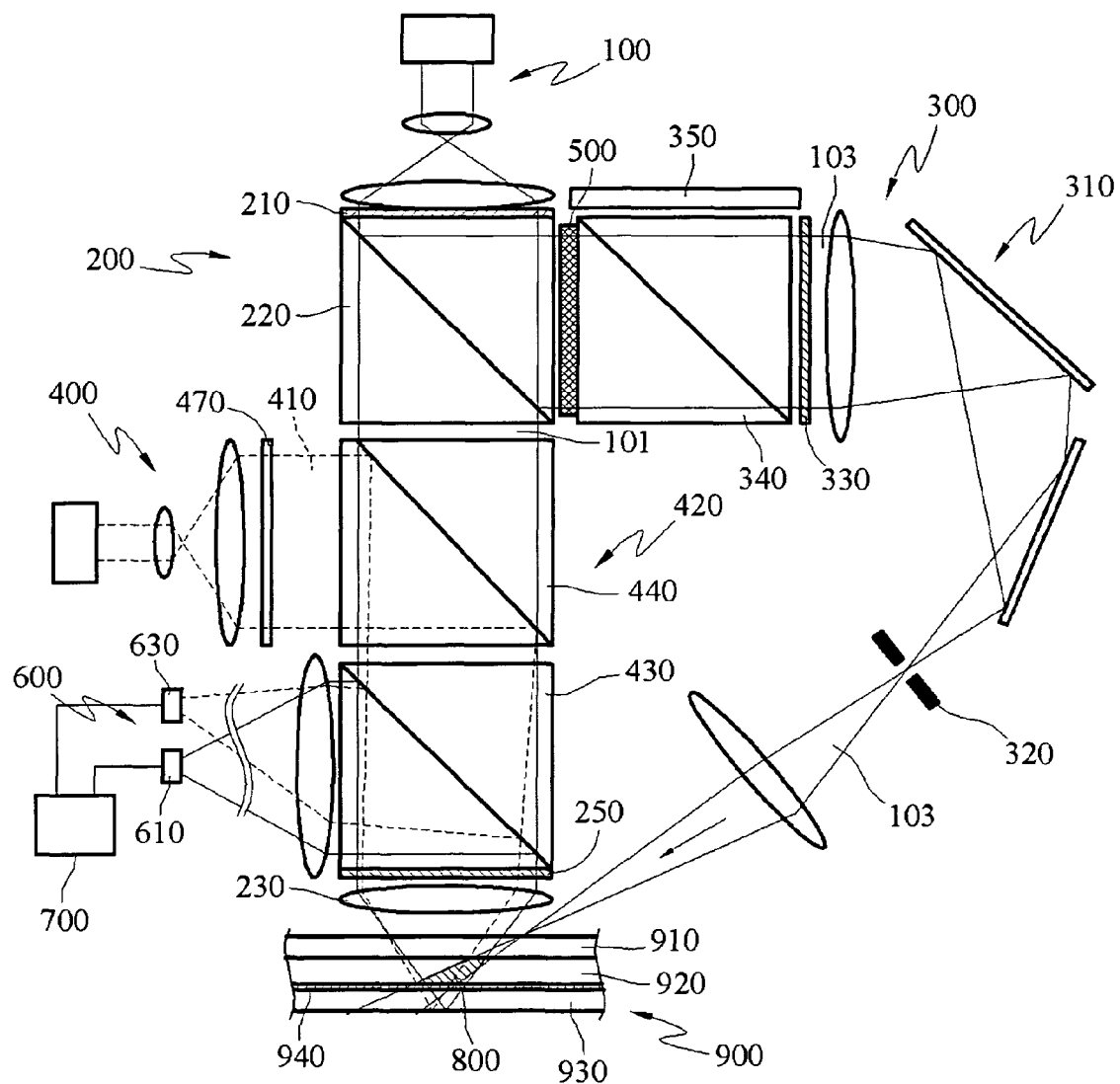
FIG. 4A is an architectural view according to a second embodiment of the present invention.

Referring to FIG. 4A, it is an architectural view according to a second embodiment of the present invention. The architecture is similar to the first embodiment, and its components will not be described any more, except only for that the first phase retardation plate 250 covers the path of the entire reference light 101 beam, such that when the reference light 101 beam passes through the first phase retardation plate 250, its polarization state is changed to S polarization, and then it is incident to the holographic recording medium 900. After passing through the second phase retardation plate 330, the signal light 103 is also incident to the holographic recording medium 900 along the second incidence direction, and thus the signal light 103 is also in S polarization state. Therefore, when the reference light 101 and the signal light 103 are incident to the holographic recording medium 900 together, they are made to interfere with one another to generate the holographic interferogram 800.

Figure 4B:
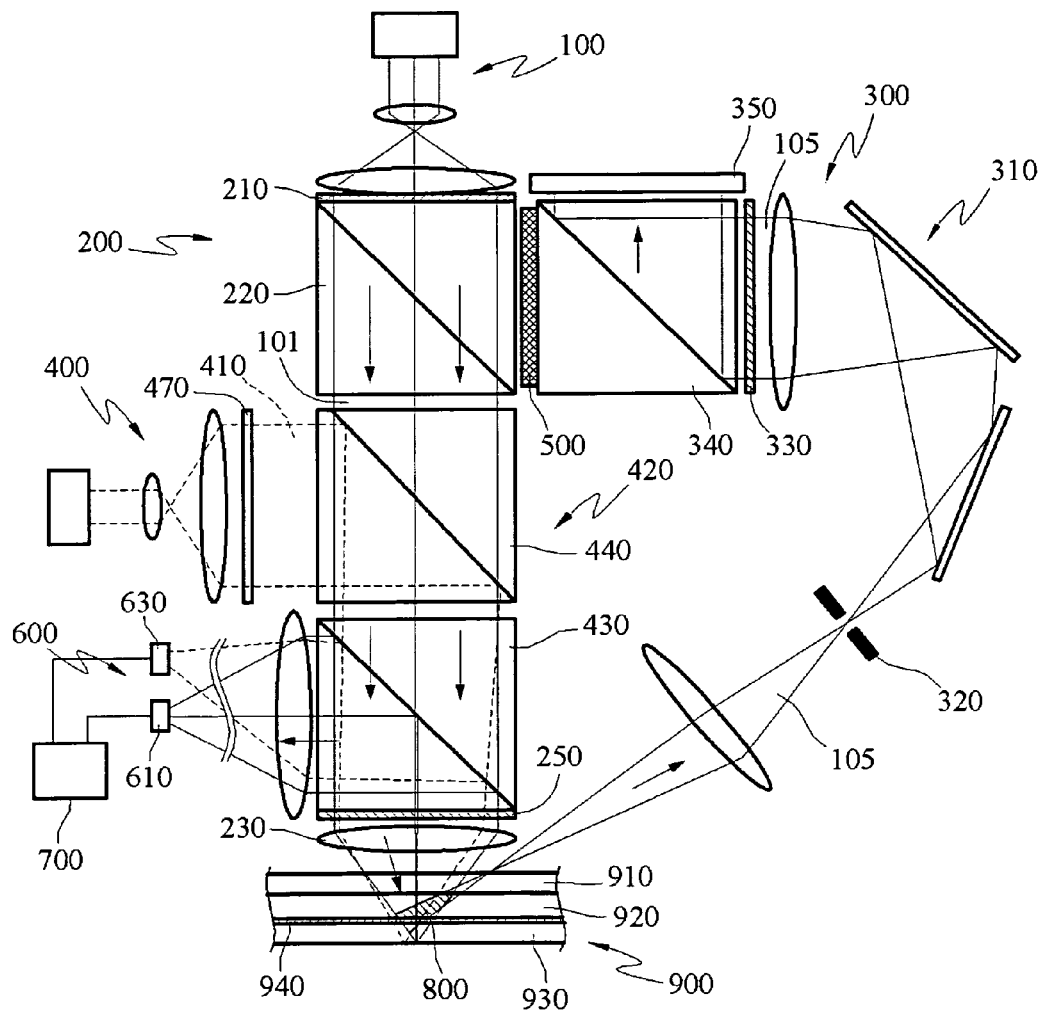
FIG. 4B is a schematic view of a servo architecture according to a second embodiment of the present invention.

A third phase retardation layer 940 is further disposed in the holographic recording medium 900. The third phase retardation layer 940 changes the linear polarized light to a circular polarized light. If the circular polarized light passes the third phase retardation layer 940 again, it will be changed to linear polarized light again; however, the polarization direction of the linear polarized light at this time is perpendicular to the polarization direction of the linear polarized light which is not incident to the third phase retardation layer 940. Therefore, if P polarization is incident to the third phase retardation layer 940 twice, it is changed to S polarization, and the function of the third phase retardation plate 940 is the same as that of the first phase retardation plate 250. The third phase retardation layer 940 is disposed between the recording layer 920 and the second substrate 930. When the reference light 101 is incident to the holographic recording medium 900, it passes through the recording layer 920 and the third phase retardation layer 940, and then is reflected by the reflective layer 950 to pass through the third phase retardation layer 940 again, such that the polarization state of the reference light 101 incident to first phase retardation plate 250 is changed to S polarization. The reference light 101 passes through the third phase retardation layer 940 twice to be changed to P polarization, and is reflected off the holographic recording medium 900 to pass through the first phase retardation plate 250 again to change its polarization state to S polarization again. Therefore, when passing through the second polarization beam splitter 430, the reflected reference light 101 is reflected and diverted to be incident to the reference light sensor 610 of the sensing portion 600, as shown in FIG. 4B.

Figure 5:
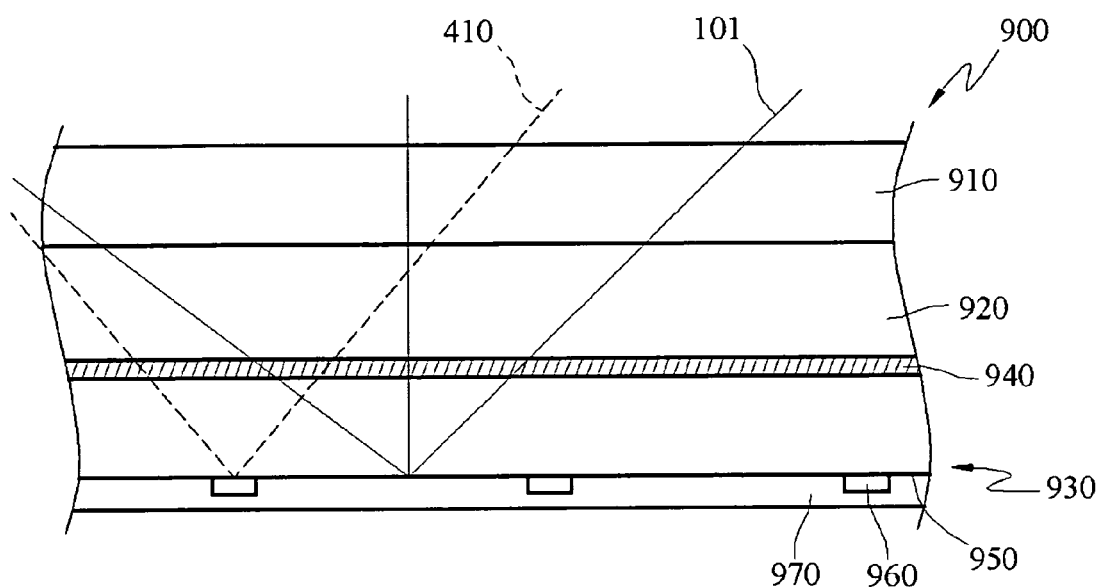
FIG. 5 is a schematic view of the reference light and the servo light incident to the holographic recording medium according to the second embodiment of the present invention.

The servo light 410 is the same as the reference light 101. After the servo light 410 is incident to dichroic prism 440, it is reflected by the dichroic prism 440 to be incident to the second polarization beam splitter 430, such that only the part of the servo light 410 of P polarization can pass through, and the servo light 410 in P polarization state passes through the first phase retardation plate 250 again to be changed to S polarization. The servo light 410 in S polarization state is incident to the servo track 960 of the holographic recording medium 900, and is reflected by the servo track 960. Therefore, the servo light 410 passes the third phase retardation layer 940 twice such that its polarization state is changed to P polarization again, and the servo light 410 is incident to the first phase retardation plate 250 again such that its polarization state is changed to S polarization again, and then the servo light 410 is reflected and diverted by the second polarization beam splitter 430 to be incident to the servo light sensor 630 of the sensing portion 600, for detecting the signal of the servo light 410 being modulated by the servo track 960, thereby the servo light 410 is converted to an electrical signal and transmitted to the control device 700. The control device 700 can move the optical architecture or the holographic recording medium 900, such that the holographic interferogram 800 can be recorded in the recording layer 920 of the holographic recording medium 900 along the servo track 960 sequentially, as shown in FIGS. 4B and 5.

Figure 6A:
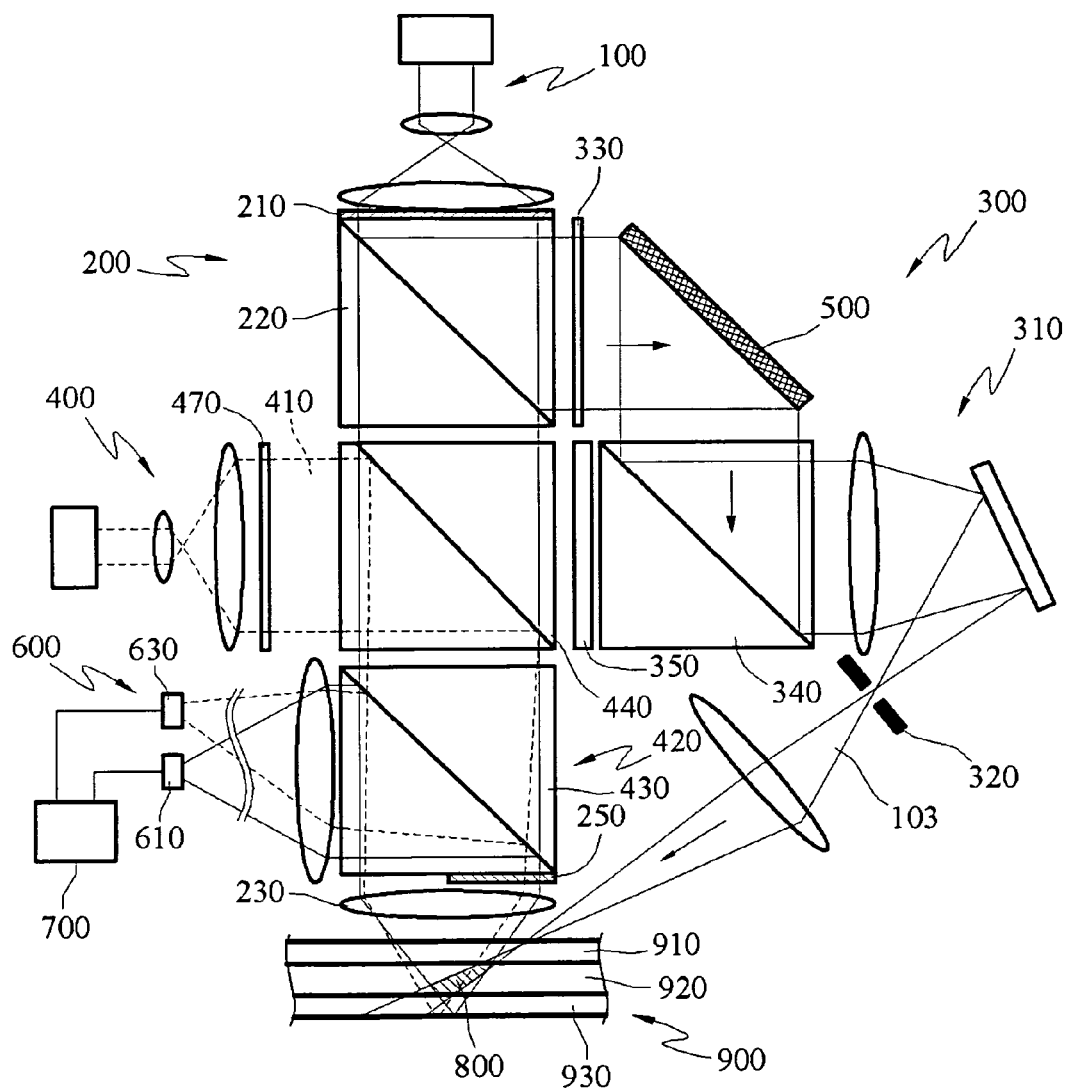
FIG. 6A is an architectural view according to a third embodiment of the present invention.

Referring to FIG. 6A, it is an architectural view according to a third embodiment of the present invention. The architecture of this embodiment is similar to that of the first embodiment, and will not be described any more. However, this embodiment uses a reflective SLM 500, such as a digital micromirror device (DMD). After being splitted by the first light guiding portion 200, the signal light 103 is incident to the second phase retardation plate 330 of the second light guiding portion 300 to change its polarization state to S polarization. Then the signal light 103 is incident to the first polarization beam splitter 340 of the second light guiding portion 300. As its polarization state is S polarization, the signal light 103 is reflected and diverted by the first polarization beam splitter 340 to be incident to the lens and the reflective mirror set 310, such that it is incident to the holographic recording medium 900 along the second incidence direction, and is made to interfere with the reference light 101 in S polarization state, thereby a holographic interferogram 800 is generated.

Figure 6B:
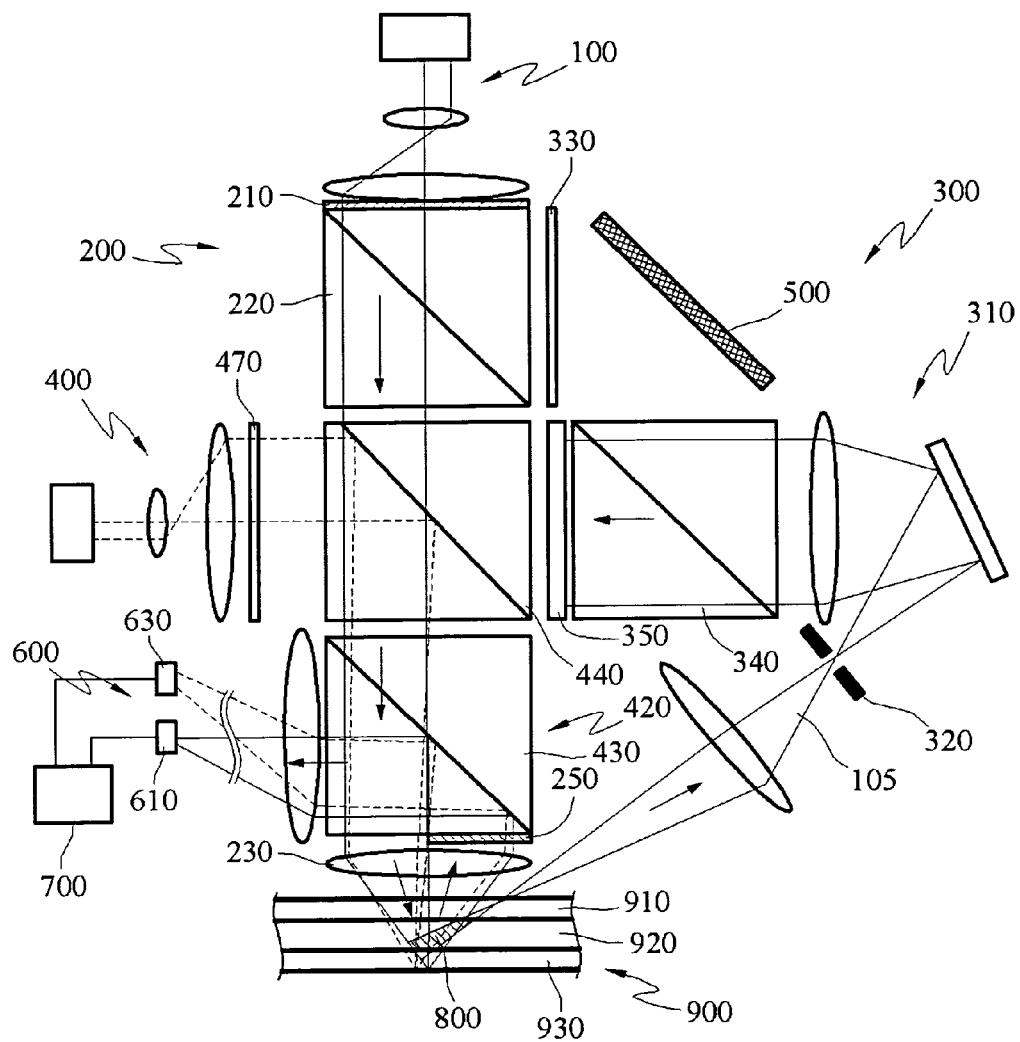
FIG. 6B is a schematical view of a reproducing state according to the third embodiment of the present invention.

If a reproduction is to be performed when reproducing, when the left reference light 101 which does not pass through the first phase retardation plate 250 is incident to the holographic recording medium 900, it will pass through the holographic interferogram 800 and the reflective layer 950, and the left reference light 101 is reflected by the reflective layer 950 towards the reflection direction to pass through the holographic interferogram 800 again, and leaves the holographic recording medium 900. The travel path of the left reference light 101 is opposite to that of the right reference light 101 when recording, therefore a conjugate reproduced light 105 is generated, which returns along the original path of the signal light 103. As the conjugate reproduced light 105 is generated by the left reference light 101 incident to the holographic interferogram 800, the polarization state of the conjugate reproduced light 105 is also P polarization. Therefore, when the conjugate reproduced light 105 returns along the original path of the signal light 103, it passes through the second phase retardation plate 330 to change its polarization state to S polarization. When the conjugate reproduced light 105 is incident to the first polarization beam splitter 340, as the polarization state of the conjugate reproduced light 105 is S polarization, it is reflected by the first polarization beam splitter 340. A two-dimensional image sensor 350 is placed at one side of the first polarization beam splitter 340 in a reflection direction of the conjugate reproduced light 105, to receive and analyze the conjugate reproduced light 105, as shown in FIG. 6B.

Figure 7A:
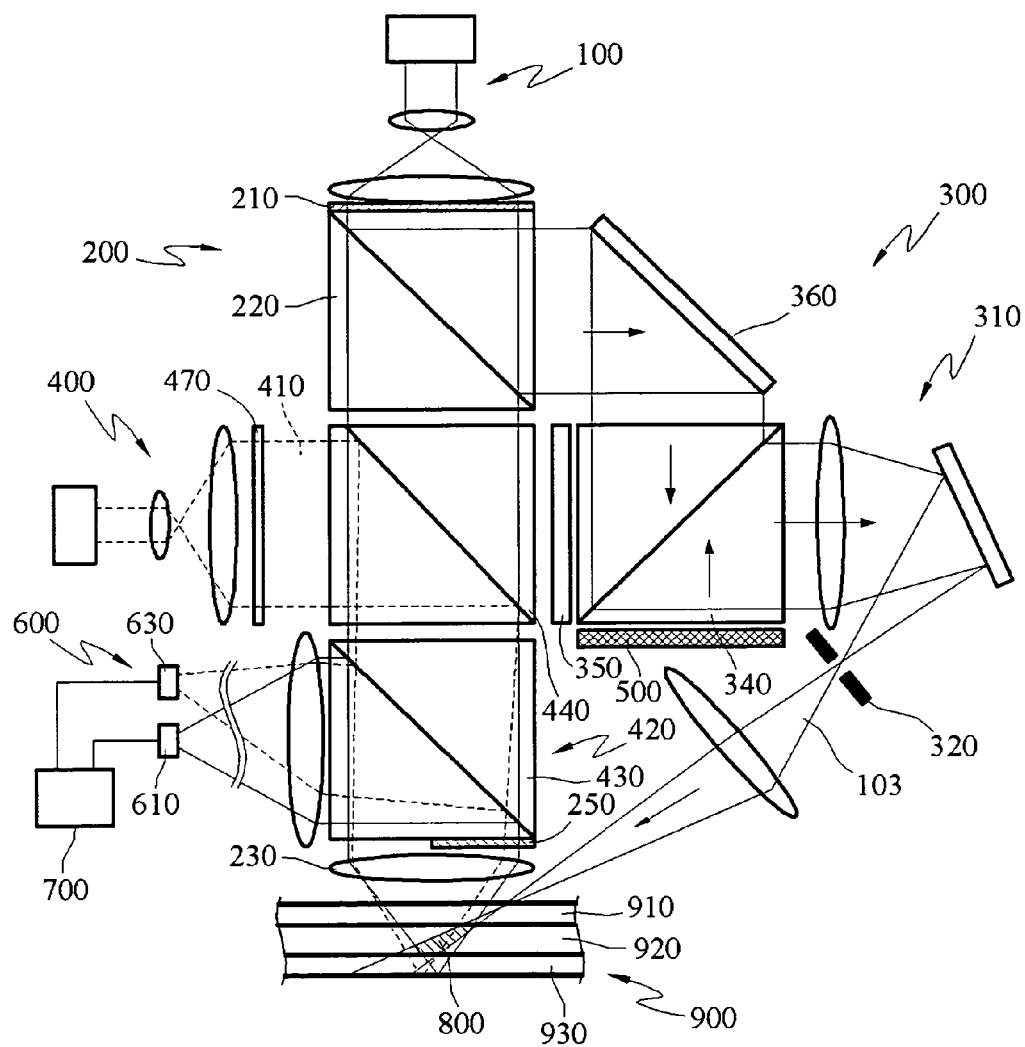
FIG. 7A is an architectural view according to a fourth embodiment of the present invention.

Referring to FIG. 7A, it is an architectural view according to a fourth embodiment of the present invention. The architecture of this embodiment is also similar to that of the first embodiment, and will not be described any more. This embodiment uses a reflective SLM 500, such as a Liquid Crystal on Silicon (LCOS) display panel. As the LCOS display panel is not provided with a polarization plate 210, when the linear polarized light of P polarization is incident to the LCOS, the desired modulated signal is reflected by the LCOS display panel to be changed to S polarization. After being splitted by the first light guiding portion 200, the signal light 103 is incident to the first reflective mirror 360 of the second light guiding portion 300, and then it is diverted to be incident to the first polarization beam splitter 340. As the signal light 103 is in P polarization state, it can be incident to the SLM 500 through the first polarization beam splitter 340, and is reflected by the SLM 500 to change its polarization state to S polarization. Therefore, when the signal light 103 is incident to the first polarization beam splitter 340, it is reflected and diverted by the first polarization beam splitter 340 to be incident to the lens and the reflective mirror set 310, such that the signal light 103 is incident to the holographic recording medium 900 along the second incidence direction, and is made to interfere with the reference light 101 in S polarization state, thereby a holographic interferogram 800 is generated.

Figure 7B:
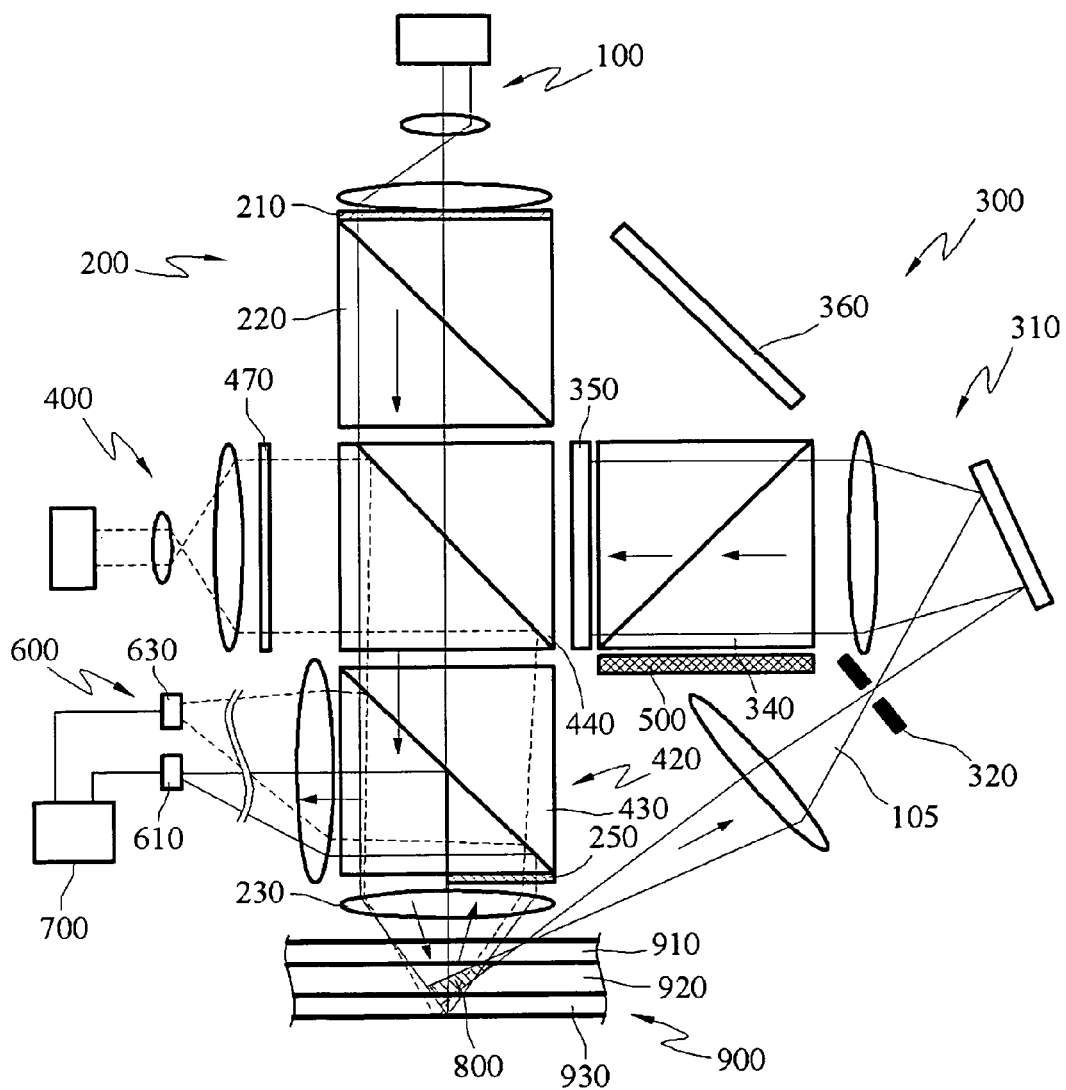
FIG. 7B is a schematical view of a reproducing state according to the fourth embodiment of the present invention.

When reproducing, when the left reference light 101 which does not pass through the first phase retardation plate 250 is incident to the holographic interferogram 800, a reproduced light 105 is generated. The polarization state of the reproduced light 105 is P polarization, the same as that of the left reference light 101. Therefore, when the reproduced light 105 is guided by the lens and the reflective mirror set 310 to be incident to the first polarization beam splitter 340, it penetrates the first polarization beam splitter 340 directly, and is incident to the two-dimensional image sensor 350, as shown in FIG. 7B.

Figure 8A:
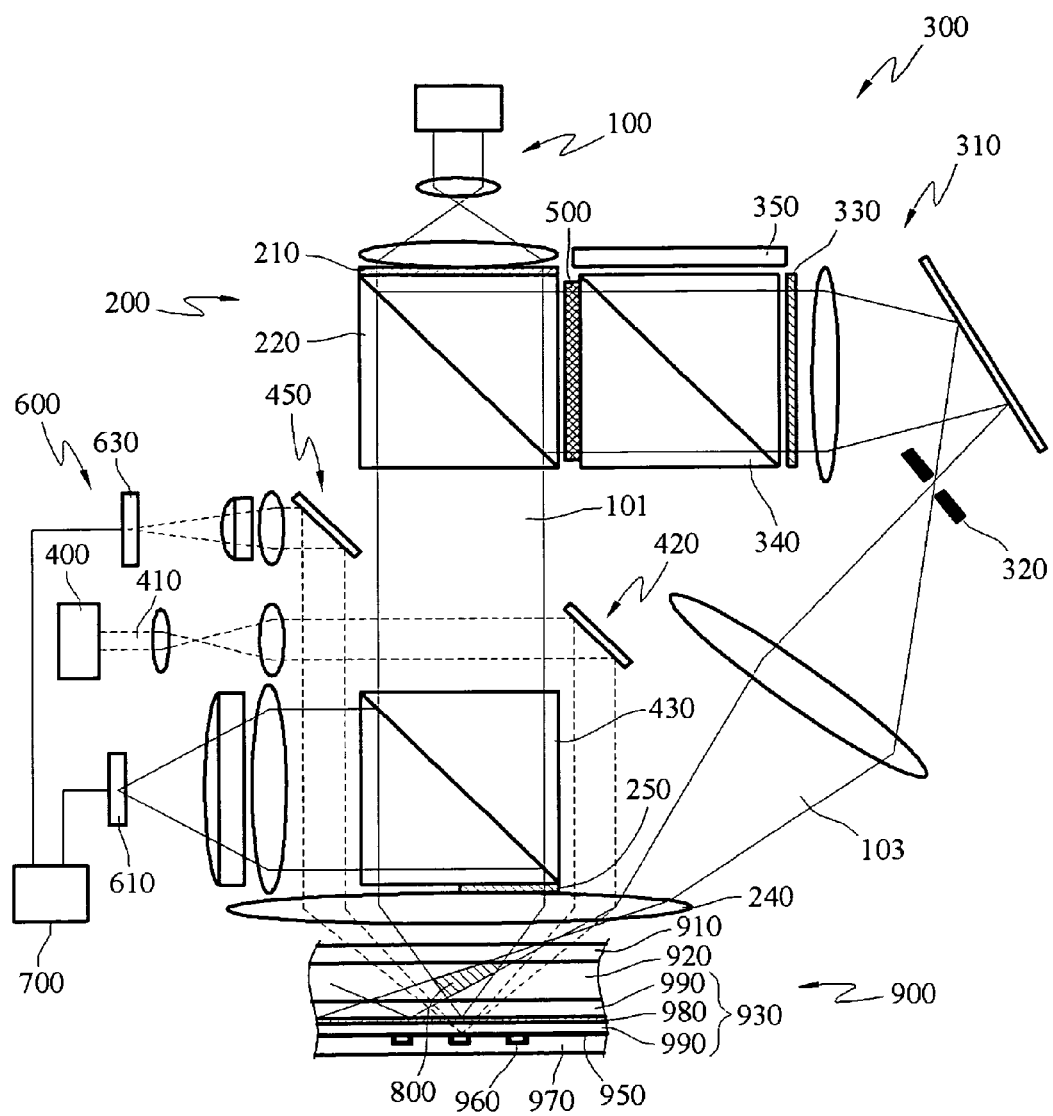
FIG. 8A is an architectural view according to a fifth embodiment of the present invention.

Referring to FIG. 8A, it is an architectural view according to a fifth embodiment of the present invention. The architecture of this embodiment is similar to that of the first embodiment, and will not be described any more. However, this embodiment uses a different servo light guiding portion 420, which comprises a second polarization beam splitter 430 and a servo light reflective mirror set 450. The second polarization beam splitter 430 is disposed between the beam splitter 220 and the first phase retardation plate 250, such that after the left reference light 101 which does not pass through the first phase retardation plate 250 is reflected by the holographic recording medium 900, it passes through the first phase retardation plate 250 to change its polarization state to S polarization. When the left reference light 101 is incident to the second polarization beam splitter 430, it is reflected and diverted to be incident to the reference light sensor 610 of the sensing portion 600, such that the left reference light 101 is converted to an electrical signal and transmitted to the control device 700. Furthermore, after the right reference light 101 passes through the first phase retardation plate 250, its polarization state is changed to S polarization. And after the right reference light 101 is incident to the holographic recording medium 900 and reflected, it does not pass through the first phase retardation plate 250, but is directly incident to the second polarization beam splitter 430. Also, the right reference light 101 is reflected and diverted by the second polarization beam splitter 430 to be incident to the reference light sensor 610 of the sensing portion 600. Therefore, the reference light 101 can be incident to reference light sensor 610 after being reflected by the holographic recording medium 900, and the reference light sensor 610 transmits the signal to the control device 700, such that the control device 700 can analyze and adjust the relative distance and oblique angle between the storage and reproduction system and the holographic recording medium 900.

Furthermore, a servo light reflective mirror set 450 is provided, for making a servo light 410 generated by the servo light source 400 be diverted to appear as a convergent beam by passing through the objective lens 230, and be incident to the holographic recording medium 900. The objective lens 230 is a bifocal objective lens 240, that is, the bifocal objective lens 240 has different focal lengths for different wavelengths. The reference light 101 is incident to the center of the bifocal objective lens 240, and the servo light 410 is incident around the bifocal objective lens 240, therefore, the bifocal objective lens 240 makes the focal length of the reference light 101 be different from that of the servo light 410. As such, the center focal length of the bifocal objective lens 240 is different from the circumferential focal length. Although the focal lengths are different, the focal points are both located on the axis of the bifocal objective lens 240. Therefore, the servo track 960 of the holographic recording medium 900 is located on the axis of the bifocal objective lens 240, and when the reference light 101 and the servo light 410 are incident to the holographic recording medium 900 together, the reference light 101 cannot be reflected by the reflective layer 950, but is directly incident to the servo track 960, such that the reference light 101 is modulated by the servo track 960, and the reference light 101 cannot be continuously reflected into the reference light sensor 610, thus the control device 700 cannot monitor and control the intensity of the reference light 101 ever and again, and cannot adjust it in a timely manner. Therefore, a wavelength selection film 980 is further disposed between the recording layer 920 and the reflective layer 950 in the holographic recording medium 900. The wavelength selection film 980 can reflect the reference light 101, while allows the servo light 410 to pass through. Moreover, an interlayer 990 is further disposed at two sides of the wavelength selection film 980 respectively, such that the reference light 101 can be focused on the wavelength selection film 980 between it and one interlayer 990. The servo light 410 passes through the wavelength selection film 980 and is focused on the servo track 960, to ensure a preferred reflection effect.

Figure 8B:
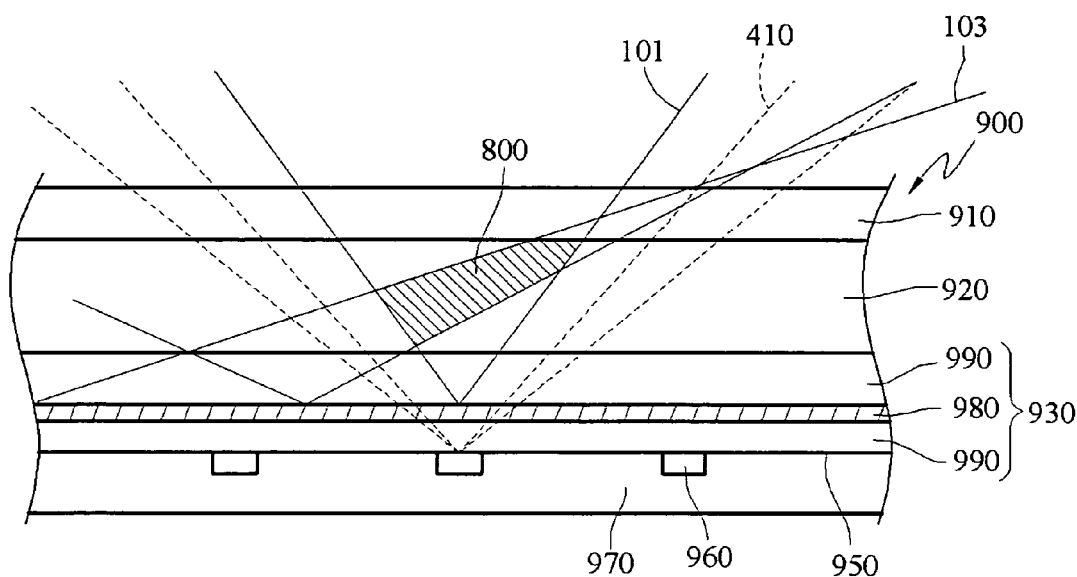
FIG. 8B is a schematic view of the reference light, the signal light and the servo light incident to the holographic recording medium according to the fifth embodiment of the present invention.

After being reflected by the wavelength selection film 980 of the holographic recording medium 900, the reference light 101 is incident to the bifocal objective lens 240 and the second polarization beam splitter 430. The servo light 410 passes through the wavelength selection film 980 of the holographic recording medium 900, and is incident to the servo track 960 of the holographic recording medium 900 and reflected by the servo track 960, and then it is incident to the servo light sensor 630 of the sensing portion 600 via the servo light reflective mirror set 450. Thereby, the servo light 410 is converted to an electrical signal and transmitted to the control device 700, such that the reference light 101 is incident to the holographic recording medium 900 along the first incidence direction, and the holographic interferogram 800 is sequentially recorded in the holographic recording medium 900 along the servo track 960, as shown in FIG. 8B.

Figure 8C:
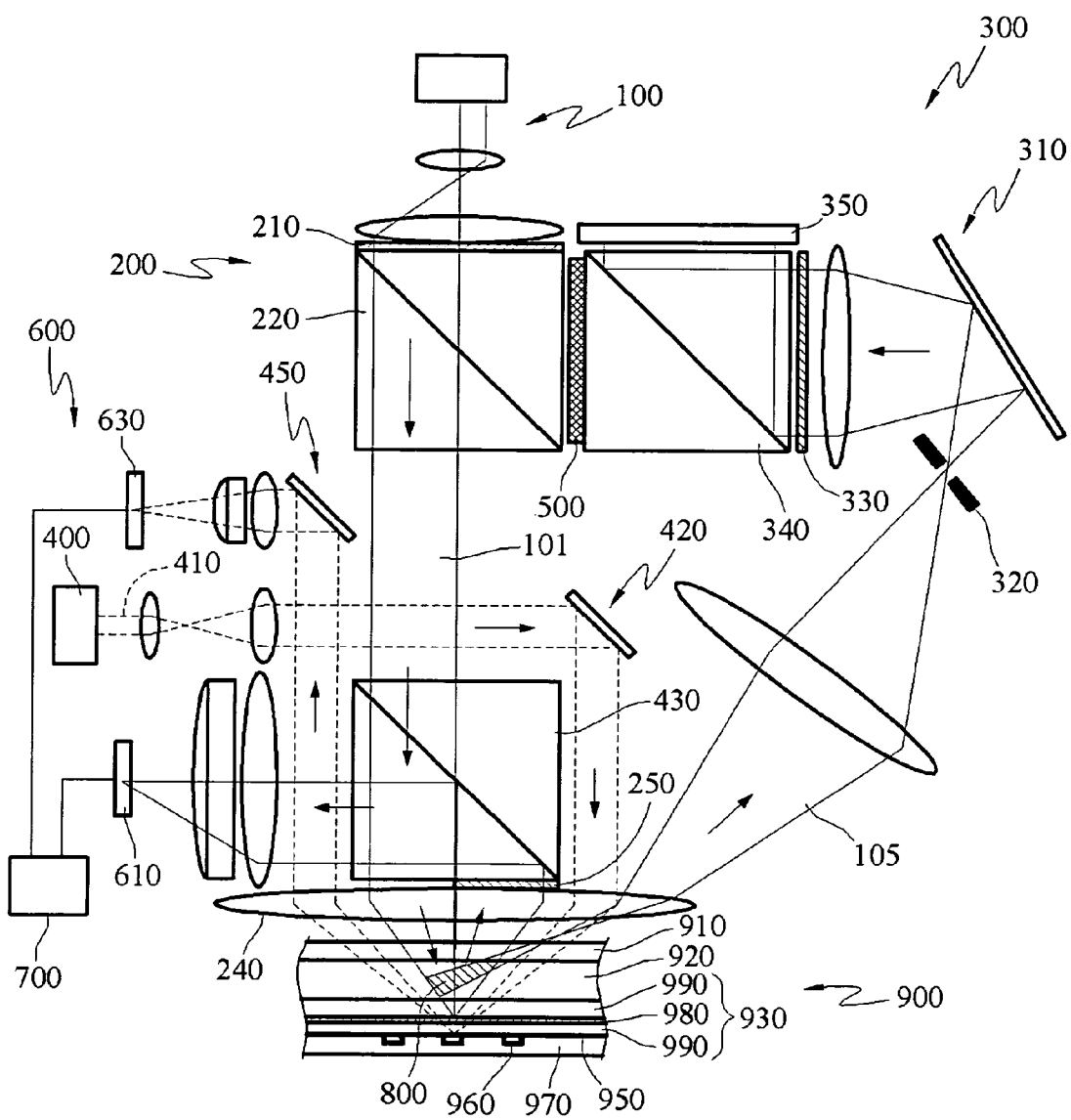
FIG. 8C is a schematical view of a reproducing state according to the fifth embodiment of the present invention.

When reproduction is to be performed, when the left reference light 101 which does not pass through the first phase retardation plate 250 is incident to the holographic recording medium 900, it passes through the holographic interferogram 800 and the reflective layer 950, and is reflected by the reflective layer 950 to pass through the holographic interferogram 800 towards the reflection direction, and leaves the holographic recording medium 900. The travel path of the left reference light 101 is opposite to that of the right reference light 101 when recording. Therefore, a conjugate reproduced light 105 is generated, which returns along the original path of the signal light 103. As the conjugate reproduced light 105 is generated by the left reference light 101 incident to the holographic interferogram 800, the polarization state of the conjugate reproduced light 105 is also P polarization. Therefore, when the conjugate reproduced light 105 returns along the original path of the signal light 103, it passes through the second phase retardation plate 330 to change its polarization state to S polarization. When the conjugate reproduced light 105 is incident to the first polarization beam splitter 340, as the polarization state of the conjugate reproduced light 105 is S polarization, it is reflected by the first polarization beam splitter 340. A two-dimensional image sensor 350 is placed at one side of the first polarization beam splitter 340 in the reflection direction of the conjugate reproduced light 105, to receive and analyze the conjugate reproduced light 105, as shown in FIG. 8C.

Figure 9:
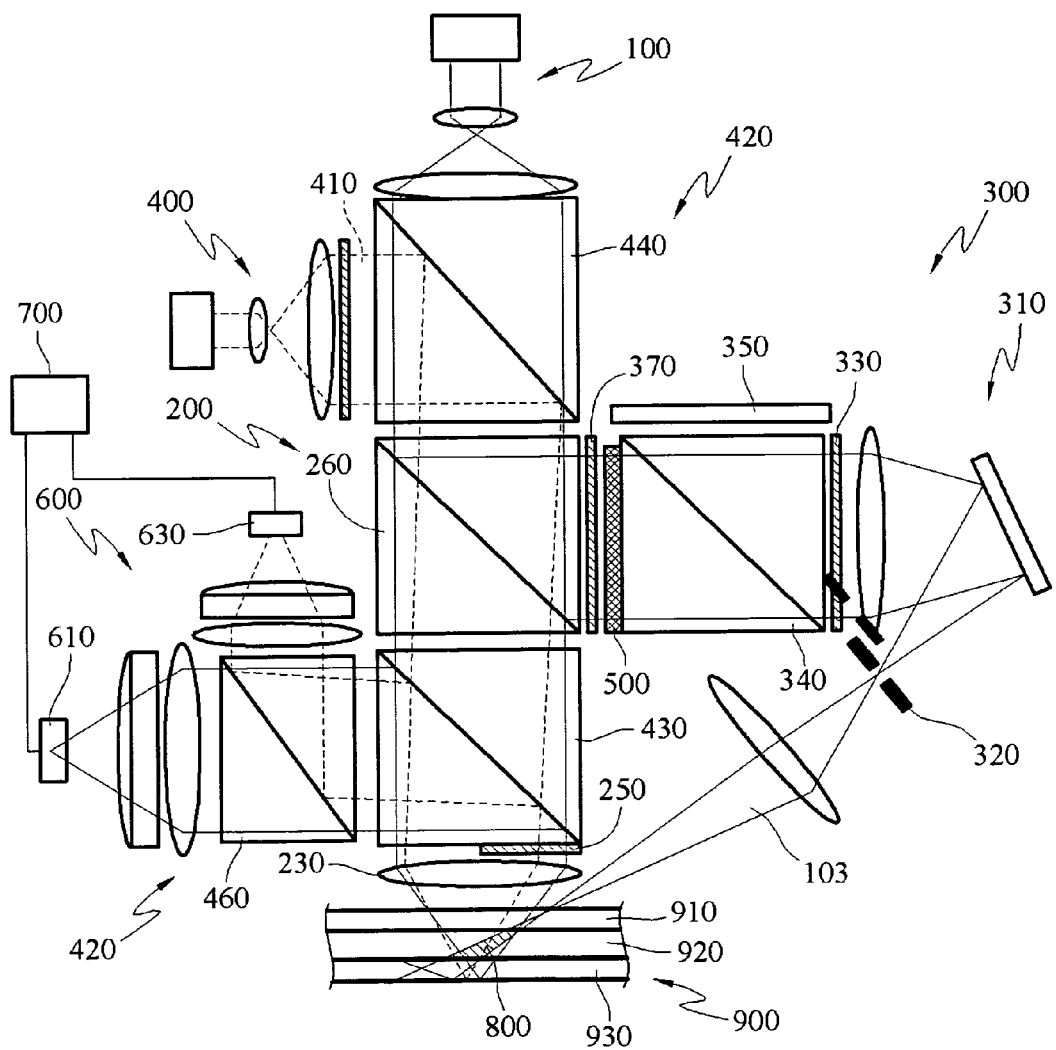
FIG. 9 is an architectural view according to a sixth embodiment of the present invention.

Referring to FIG. 9, it is an architectural view according to a sixth embodiment of the present invention. The architecture in this embodiment is also similar to the first embodiment, and will not be described any more. In this embodiment, the beam splitter 220 of the first light guiding portion 200 of the first embodiment is changed to a third polarization beam splitter 260, which can replace the polarization plate and the beam splitter 220 disposed in front of the light source 100, such that after passing through the third polarization beam splitter 260, the light generated by the light source 100 is split into two lights, i.e. the reference light 101 and the signal light 103. The polarization states of the two lights are P polarization and S polarization, which are perpendicular to each other. To change the polarization state of the signal light 103 incident to the SLM 500 to P polarization, a fourth phase retardation plate 370 is disposed at one side of the third polarization plate 210 in the path of the signal light 103, such that the polarization state of the signal light 103 is changed to P polarization, and thus the transmission modes of the signal light 103 and the reference light 101 are the same as that of the first embodiment.

Furthermore, another difference between this embodiment and the first embodiment is the servo light guiding portion 420. The servo light guiding portion 420 comprises a polarization plate, a dichroic prism 440, a second polarization beam splitter 430, and a secondary dichroic prism 460. The polarization plate 210 is disposed in front of the servo light source 400, such that the light generated by the servo light source 400 is changed to P polarization. The dichroic prism 440 is disposed between the light source 100 and the third polarization beam splitter 260. The second polarization beam splitter 430 is disposed between the third polarization beam splitter 260 and the first phase retardation plate 250. After being changed to P polarization, the servo light 410 is incident to the dichroic prism 440, which is used to separate light with different wavelengths, such that the wavelength of the reference light 101 can penetrate the dichroic prism 440. Although the dichroic prism 440 is disposed in the path of the reference light 101, the reference light 101 is not influenced. As for the servo light 410, after it is incident to the dichroic prism 440, the servo light 410 is reflected and diverted by the dichroic prism 440 to be incident towards the holographic recording medium 900 at a slight oblique angle. A part of the servo light 410, i.e. the right servo light 410, is incident to the first phase retardation plate 250 at first to change its polarization state to P polarization, and is then incident to the holographic recording medium 900 and reflected by the servo track 960 of the holographic recording medium 900. The other part of the servo light 410, i.e. the left servo light 410, is incident to the holographic recording medium 900 at first, and is also incident to the first phase retardation plate 250, after being reflected by the holographic recording medium 900, thus the former left servo light 410 in P polarization state is changed to a left servo light 410 in S polarization state, and the left servo light 410 in S polarization state is reflected when it is incident to the second polarization beam splitter 430.

The second polarization beam splitter 430 is disposed between the third polarization beam splitter 260 and the first phase retardation plate 250. After the left reference light 101 which does not pass through the first phase retardation plate 250 is reflected by the holographic recording medium 900, it passes through the first phase retardation plate 250 to change its polarization state to S polarization. The left reference light 101 is incident to the second polarization beam splitter 430 and is then reflected. After it is incident to the holographic recording medium 900 and reflected, the right servo light 410 directly incident to the holographic recording medium 900 is incident to the first phase retardation plate 250 to change its polarization state, and is reflected and diverted by the second polarization beam splitter 430.

After the reference light 101 and the servo light 410 are reflected by the holographic recording medium 900 and the second polarization beam splitter 430, they should be separated and obtained respectively. A secondary dichroic prism 460 is disposed at one side of the second polarization beam splitter 430, such that after being splitted and reflected by the second polarization beam splitter 430, the reference light 101 and the servo light 410 are both incident to the secondary dichroic prism 460, the property of the secondary dichroic prism 460 is the same as that the dichroic prism 440. The reference light 101 passes through the secondary dichroic prism 460 directly, and is directly incident to the reference light sensor 610 of the sensing portion 600. The servo light 410 is reflected and diverted by the secondary dichroic prism 460 to the servo light sensor 630 of the sensing portion 600. As such, the reference light 101 and the servo light 410 are converted by the sensing portion 600 to electrical signals and transmitted to the control device 700 respectively. The reference light 101 is adjusted by the control device 700 to be perpendicularly incident to the holographic recording medium 900, and the holographic interferogram 800 is sequentially recorded in the holographic recording medium 900 along the servo track 960.

Figure 3A:
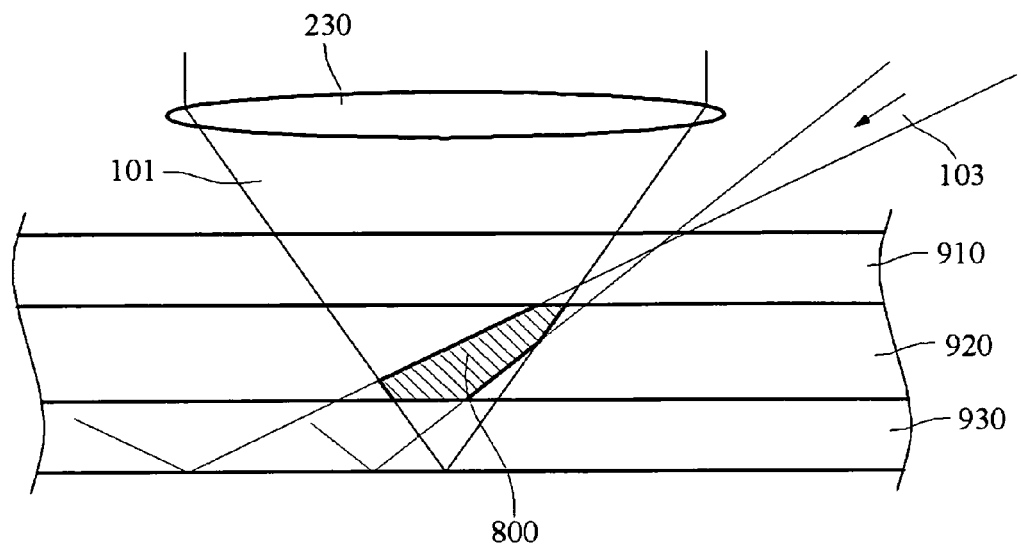
FIGS. 3A and 3B are schematic views of two forms of the reference light and the signal light incident to the holographic recording medium according to the first embodiment of the present invention.
Figure 3B:
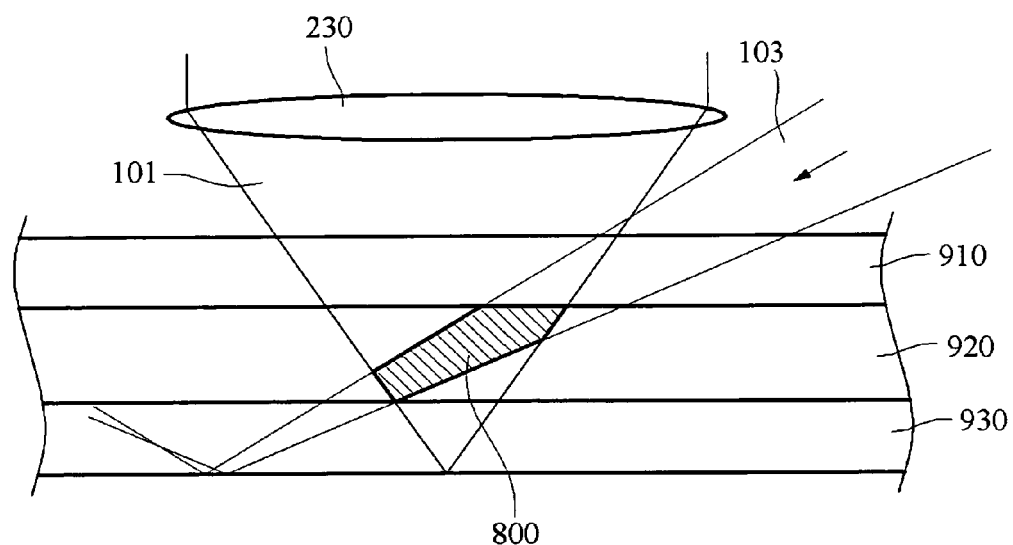

The above embodiments can be used for increasing storage capacity in combination with various multiplexing mechanisms, such as an angle multiplexing as shown in FIGS. 3A and 3B.

Figure 10A:
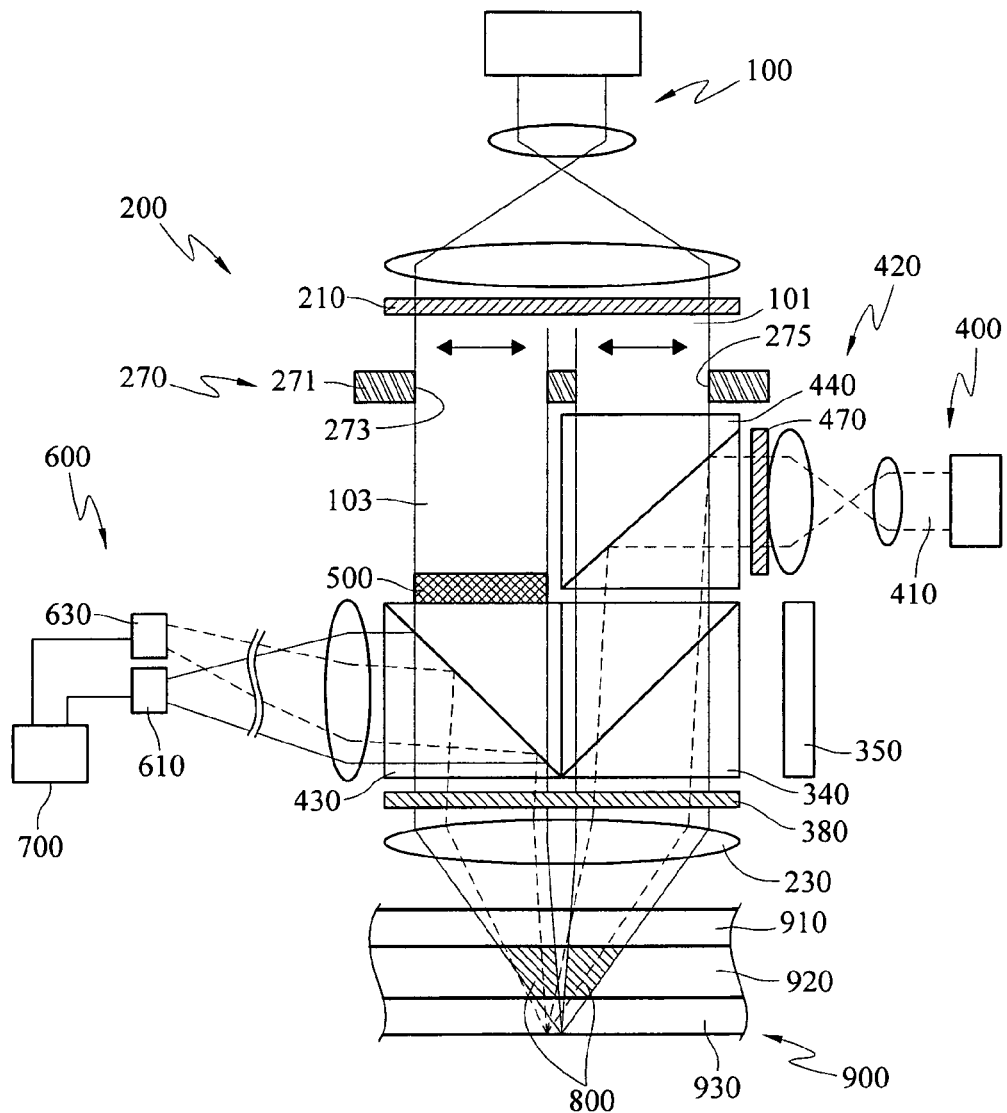
FIG. 10A is an architectural view according to a seventh embodiment of the present invention.

Referring to FIG. 10A, it is an architectural view according to a seventh embodiment of the present invention. A holographic storage and reproduction system of the present invention is used to store the holographic interference signal in a holographic recording medium 900. A light source 100 can generate a signal light 103 and a reference light 101 which are parallel to each other, and the signal light 103 and the reference light 101 are both perpendicularly incident to the holographic recording medium 900. Before the signal light 103 and the reference light 101 are incident to the holographic storage, the signal light 103 and the reference light 101 pass through the objective lens 230, such that the signal light 103 and the reference light 101 appear as convergent beams and are incident to the holographic recording medium 900 together. A SLM 500 is located in the path of the signal light 103, such that after the signal light 103 is incident to the SLM 500, it passes through the objective lens 230 to be made to interfere with the reference light, thereby generating a holographic interferogram 800 and storing it in the holographic recording medium 900.

When the reference light 101 is perpendicularly incident to the holographic interferogram 800 again, a reproduced light 105 is generated, which is incident to the image sensor along the path of the signal light 103. Then, the stored data can be obtained by reading the image sensor.

To guide the signal light 103 and the reference light 101 to be incident perpendicular to the holographic recording medium 900, a first light guiding portion 200 and a second light guiding portion 300 are used to achieve the object. The first light guiding portion 200 comprises a polarization plate 210 and a splitter component 270, and the second light guiding portion 300 comprises a polarization beam splitter 220 and a phase retardation plate.

Figure 10B:
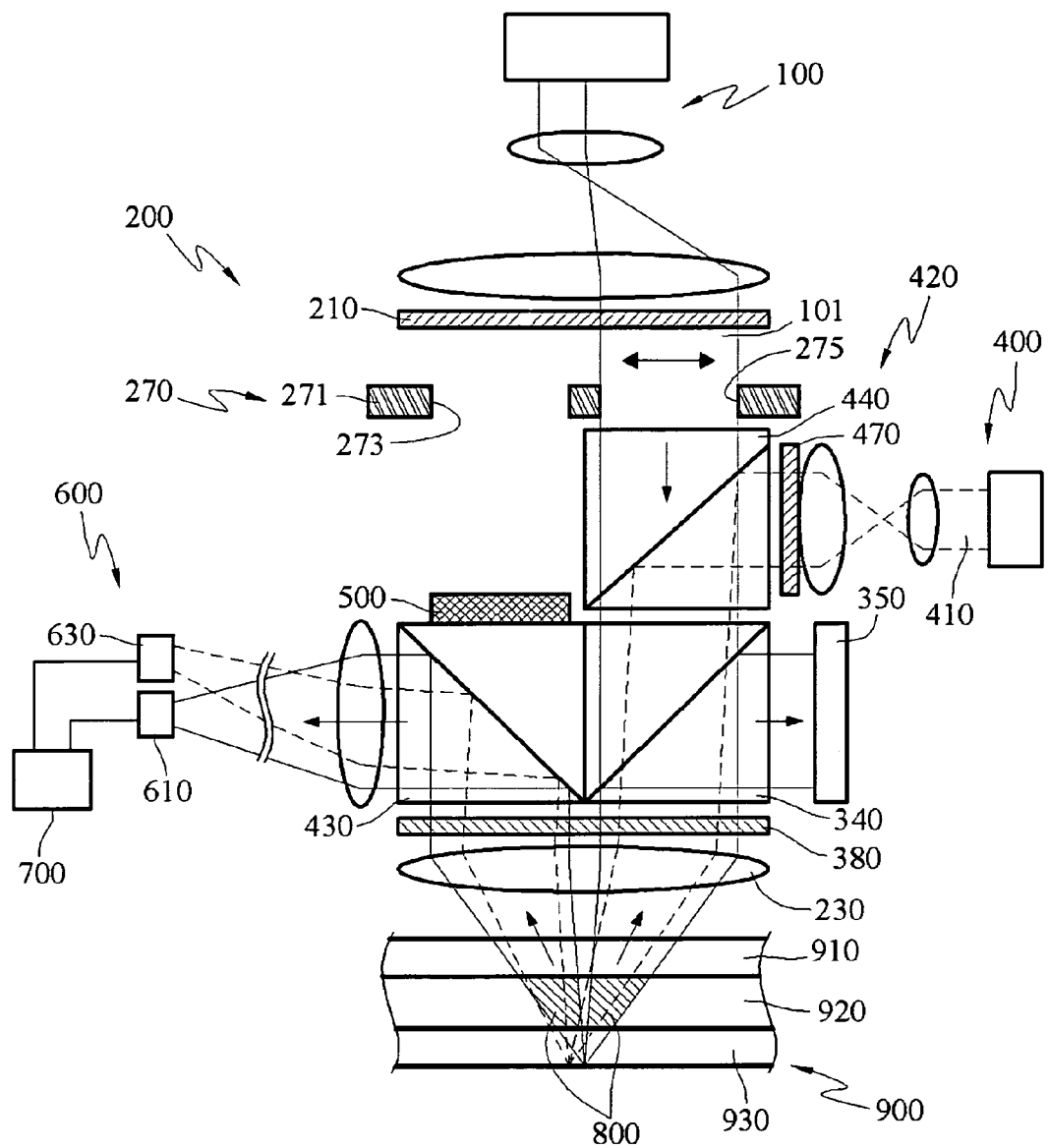
FIG. 10B is a schematical view of a reproducing state according to the seventh embodiment of the present invention.
Figure 10C:
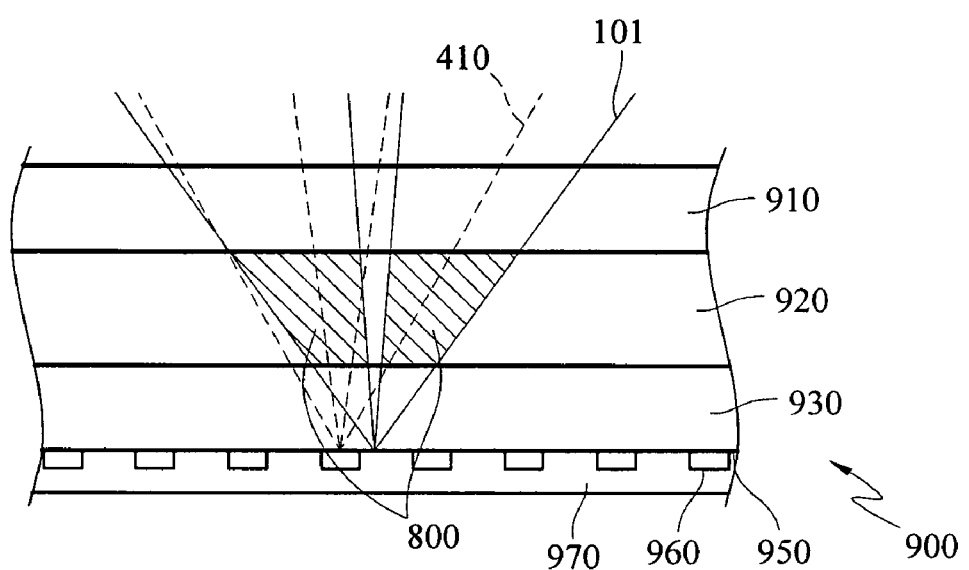
FIG. 10C is a schematic view of the reference light and the servo light incident to the holographic recording medium according to the seventh embodiment of the present invention.

The polarization plate 210 of the first light guiding portion 200 is disposed in front of the light source 100, such that after passing through the polarization plate 210, the light generated by the light source 100 is changed to a linear polarized light in P polarization state, and the linear polarized light passes through the splitter component 270 to be split into a reference light 101 and a signal light 103 which are parallel to each other. The reference light 101 is incident to the first polarization beam splitter 340 of the second light guiding portion 300 disposed in the path of the reference light 101 at first. As its polarization state is P polarization, the reference light 101 passes through the first polarization beam splitter 340 directly, and then passes through the phase retardation plate disposed at one side of the first polarization beam splitter 340. The linear polarized light is changed to a circular polarized light by the phase retardation plate. When the circular polarized light is reflected to pass through the phase retardation plate again, it is changed to a linear polarized light with a polarization state perpendicular to the former linear polarized light. For example, after the linear polarized light in P polarization state passes through the phase retardation plate, it is changed to a left circular polarized light, and after the left circular polarized light is reflected, it is changed to a right circular polarized light, and when the right circular polarized light passes through the phase retardation plate, it is changed to S polarization. The phase retardation plate with such a property is, such as a ¼λ wave plate. When the reference light 101 passes through the phase retardation plate, it is changed to a circular polarized light. Furthermore, after the signal light 103 passes through the SLM 500, it also passes through the phase retardation plate, and its polarization state is also changed to a circular polarized light. After being splitted by the splitter component 270, the reference light 101 and the signal light 103 are symmetrically propagated along the central axis of the objective lens 230. After passing through the phase retardation plate, the reference light 101 and the signal light 103 both pass through the objective lens 230 to make the beams thereof appear a convergent form, and they are reflected towards the holographic recording medium 900. The paths of the reference light 101 and the signal light 103 are overlapped, and they are propagated towards opposite directions. As the polarization states of the reference light 101 and the signal light 103 are both circular polarized light, an interference will be generated. Therefore, the holographic interferogram 800 is generated in the holographic recording medium 900 by the reference light 101 and the signal light 103, as shown in FIG. 10C.

When reproducing, after the reference light 101 is incident to the holographic interferogram 800, a reproduced light 105 is generated and propagated along the original path of the signal light 103. The polarization state of the reproduced light 105 is also a circular polarized light. When the reproduced light 105 passes through the phase retardation plate, the polarization state is changed to S polarization. Through the first polarization beam splitter, the reproduced light 105 will be reflected and diverted to be incident to the two-dimensional image sensor 350, such that the reproduced light 105 is converted to a reproduced signal, and the stored data can be read out.

Furthermore, to endow the system with a feedback control, a servo light 410 and a servo light guiding portion 420 are used. The servo light source 400 can generate a servo light 410, wherein the wavelength of the servo light 410 is different from the wavelengths of the signal light 103 and the reference light 101. The servo light guiding portion 420 comprises a dichroic prism 440 and a second polarization beam splitter 430. The dichroic prism 440 is used to separate light with different wavelengths. Therefore, the reference light 101 can pass though the dichroic prism 440 directly, while the servo light 410 is reflected. The dichroic prism 440 is disposed in the path of the reference light 101. Therefore, the reference light 101 passes through the dichroic prism 440 without being influenced, while the servo light 410 is diverted to pass through the first polarization beam splitter 340 and the phase retardation plate after it is incident to the dichroic prism 440 and reflected, and is incident to the servo track 960 of the holographic recording medium 900, and passes through a second polarization beam splitter 430 disposed in the path of the signal light 103. After the servo light 410 is reflected by the servo track 960, it passes through the phase retardation plate to change its polarization state to S polarization. When the servo light 410 is incident to the second polarization beam splitter 430, it is reflected and diverted to be incident to the servo light sensor 630 of sensing portion 600, such that the servo light 410 is converted to an electrical signal and transmitted to the control device 700. The control device 700 makes the reference light 101 be perpendicularly incident to the holographic recording medium 900, and the holographic interferogram 800 be sequentially recorded in the holographic recording medium 900 along the servo track 960.

When reference light 101 is reflected by the holographic recording medium 900 and passes through the phase retardation plate again, the polarization state of the reference light 101 is changed to S polarization again. When the reference light 101 is incident to the second polarization beam splitter 430, it is reflected and diverted by the second polarization beam splitter 430 to be incident to the reference light sensor 610 of the sensing portion 600, such that the reference light 101 is converted to an electrical signal and transmitted to the control device 700, and the control device 700 can analyze and adjust the relative distance and oblique angle between the storage and reproduction system and the holographic recording medium 900, as shown in FIG. 10B.

In order to make the servo light 410 which is not in P polarization state be reflected and diverted by the first polarization beam splitter 340 to be incident to other component to cause an interference when the servo light 410 is incident to the first polarization beam splitter 340, a second polarization plate 470 is added in the servo light guiding portion 420, which is disposed in front of the servo light source 400, for making the servo light 410 be a linear polarized light in a P polarization state.

The aforementioned splitter component 270 uses a board 271 with a first hole 273 and a second hole 275 opened therein. When the linear polarized light generated by the light source 100 passes through the first hole 273 and the second hole 275, it is split into a signal light 103 and a reference light 101, which are parallel to each other and symmetrical about the central axis of the objective lens 230.

The SLM 500 of this embodiment is a transmissive SLM 500, such as a transmissive liquid crystal panel.

Several embodiments are provided above directed to a holographic storage and reproduction system to achieve the feedback control, such that the holographic storage is more accurate, and through the servo mechanism, it is traceable when reading and storing, thereby storing and reproducing data quickly can be achieved.

Figure 11:
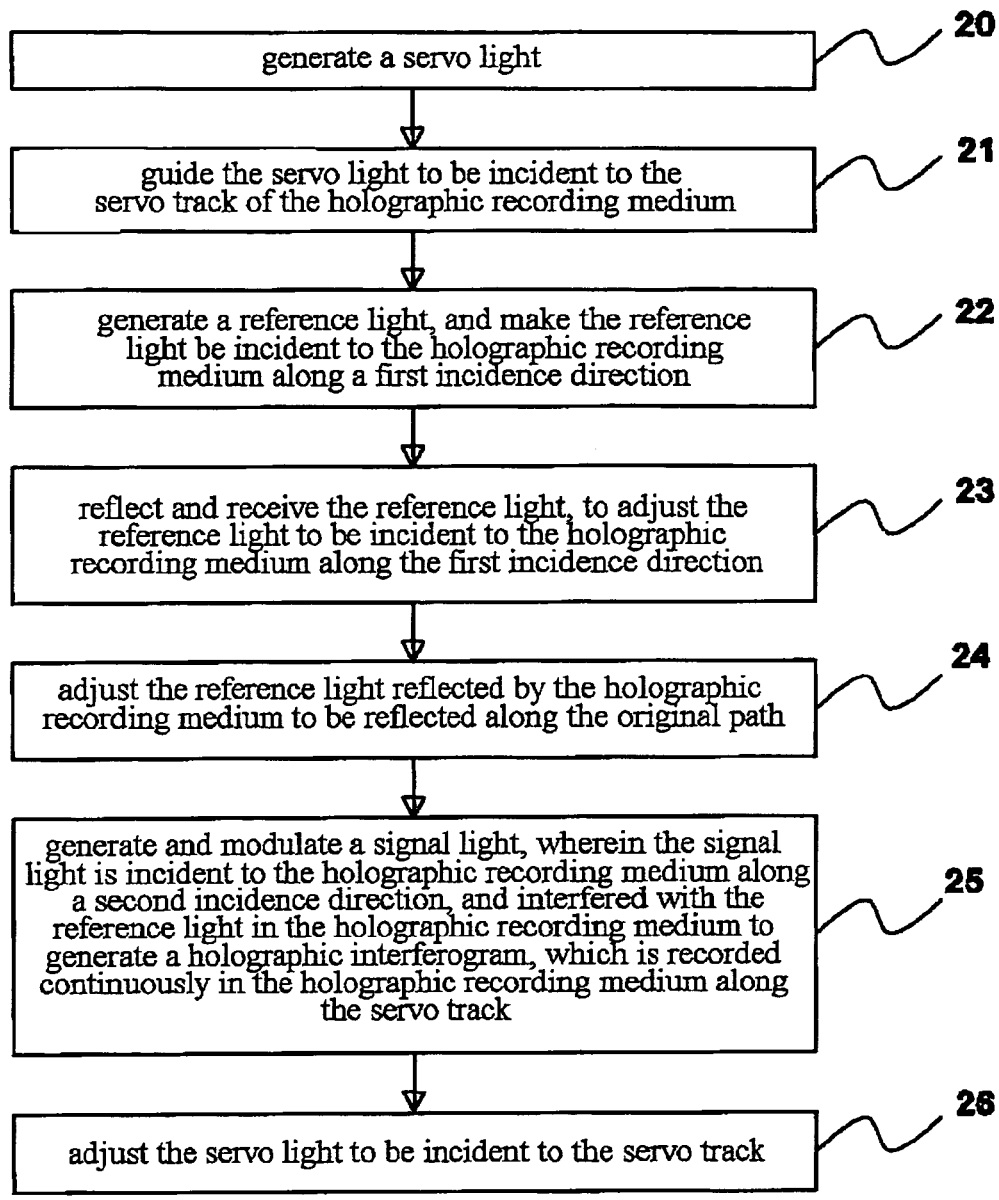
FIGS. 11, 12 and 13 are flow charts according to the present invention.

Referring to FIG. 11, the present invention further provides a holographic optical storage and reproduction method, which comprises the following steps:

producing a servo light (Step 20); guiding the servo light to be incident to the servo track of the holographic recording medium (Step 21); further producing a reference light when the servo light is located in a expected recording address, and making the reference light be incident to the holographic recording medium along a first incidence direction (Step 22); reflecting and receiving the reference light, analyzing it to readjust the relative distance and oblique angle between the entire optical architecture and the holographic recording medium, such that the reference light is incident to the holographic recording medium in the first incidence direction (Step 23); adjusting the reference light reflected by the holographic recording medium to be reflected along the original path (Step 24); generating a signal light, modulating the signal light by the SLM, and diverting the signal light, such that the signal light is incident to the holographic recording medium along a second incidence direction to be made to interfere with the reference light, thereby generating a holographic interferogram, which is recorded continuously in the holographic recording medium along the servo track (Step 25); and turning off the reference light and the signal light, maintaining the servo light to be turned on, receiving the reflected servo light by the sensor, and analyzing it to readjust the entire optical architecture, such that the incident servo light is focused on the servo track of the holographic recording medium, and moves continuously around the servo track, and decoding the address and other data on the servo track (Step 26).

Figure 12:
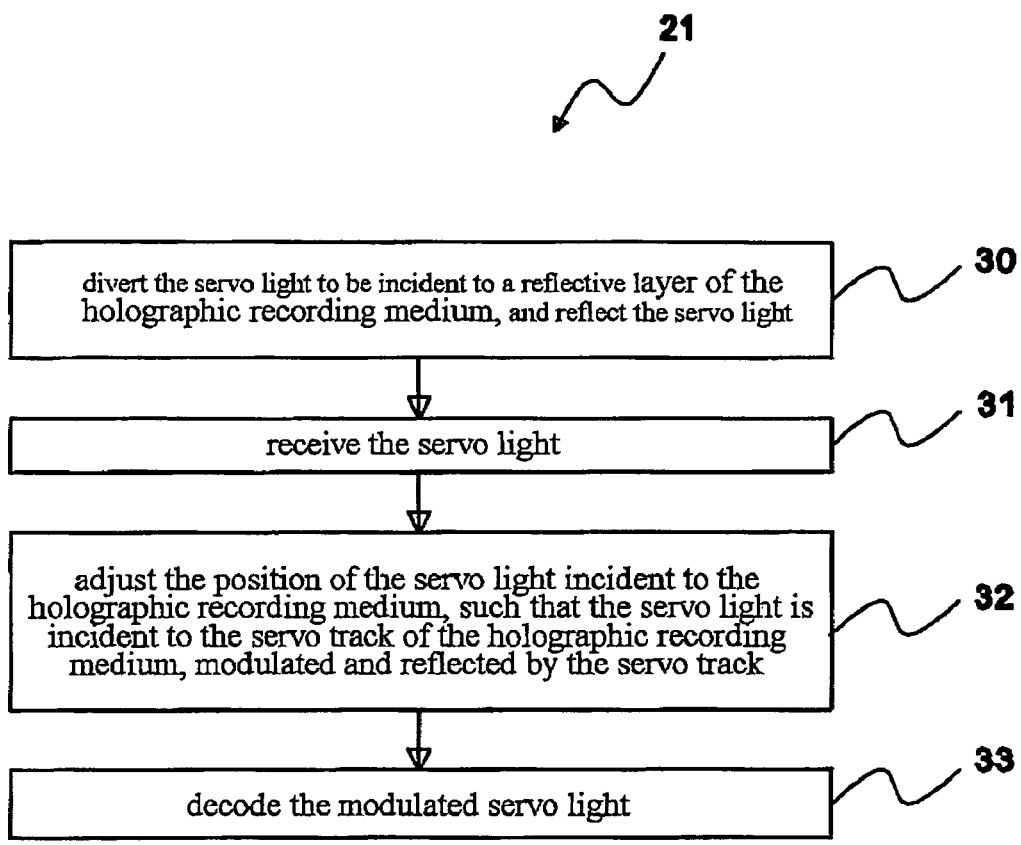

Referring to FIG. 12, guiding the servo light to be incident to the servo track of the holographic recording medium (Step 21) comprises the following steps: diverting the servo light to be incident to the reflective layer of the holographic recording medium, and reflecting the servo light (Step 31); receiving the reflected servo light by the sensor (Step 32); analyzing it to adjust the entire optical architecture, such that the incident servo light changes its position focused in the holographic recording medium, and is incident to the servo track of the holographic recording medium, and continuously moves around the servo track (Step 33); and decoding the address and other data on the servo track (Step 34).

Figure 13:
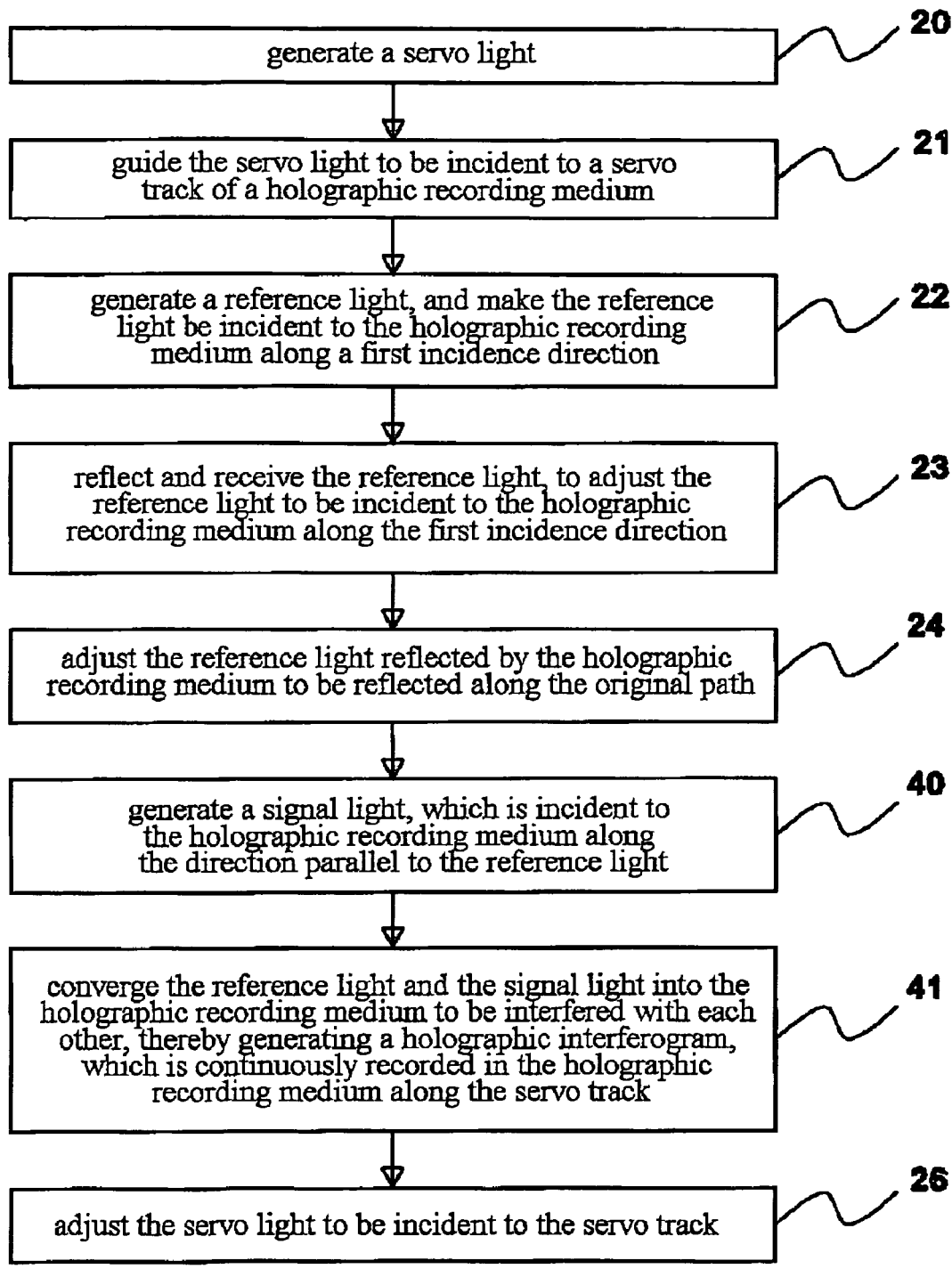

Referring to FIG. 13, another holographic optical storage and reproduction method is provided, which comprises the following steps:

generating a servo light (Step 20); guiding the servo light to be incident to the servo track of the holographic recording medium (Step 21); generating a reference light when the servo light is located in a expected recording address, and making the reference light be incident to the holographic recording medium along the first incidence direction (Step 22); reflecting and receiving the reference light, analyzing it to adjust the relative distance and oblique angle between the entire architecture and the holographic recording medium, such that the reference light is incident to the holographic recording medium along the first incidence direction (Step 23); adjusting the reference light reflected by the holographic recording medium to be reflected along the direction which is symmetric to the original path (Step 24); generating a signal light, modulating the signal light by the SLM, and diverting the signal light, such that the signal light is incident to the holographic recording medium along the direction parallel to the reference light (Step 40); converging the reference light and the signal light into the holographic recording medium, such that they are made to interfere with one another, thereby generating the holographic interferogram, which is continuously recorded in the holographic recording medium along the servo track (Step 41); and turning off the reference light and the signal light, maintaining the servo light to be turned on, receiving the reflected servo light by the sensor, and analyzing it to readjust the entire optical architecture, such that the incident servo light is focused on the servo track of the holographic recording medium, and moves continuously around the servo track, and decoding the address and other data on the servo track (Step 26).

Referring back to FIG. 12, guiding the servo light to be incident to the servo track of the holographic recording medium (Step 21) comprises the following steps: diverting the servo light to be incident to the reflective layer of the holographic recording medium, and reflecting the servo light (Step 31); receiving the reflected servo light by the sensor (Step 32), and analyzing it to adjust the entire optical architecture, such that the incident servo light changes the position focused in the holographic recording medium, to be incident to the servo track of the holographic recording medium, and continuously move around the servo track (Step 33); and decoding the address and other data on the servo track (Step 34).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A holographic storage and reproduction system with a servo, comprising:
   a holographic recording medium;
   a light source, for generating a signal light and a reference light, wherein the reference light is incident to the holographic recording medium along a first incidence direction;
   a spatial light modulator (SLM), located in the signal light path, such that the signal light is incident to the holographic recording medium along a second incidence direction after the signal light is incident to the SLM, and is made to interfere with the reference light, thereby generating a holographic interferogram in the holographic recording medium;
   wherein, when the reference light is incident to the holographic interferogram along the first incidence direction again, a reproduced light is generated and incident to an image sensor along the signal light path;
   a servo light guiding portion, for guiding the reference light to a sensing portion after being reflected by the holographic recording medium for analyzing and adjusting the relative distance and oblique angle between the storage and reproduction system and the holographic recording medium; and
   a servo light source, for generating a servo light, wherein the servo light is incident to a servo track of the holographic recording medium through the servo light guiding portion, reflected by the servo track, and received by the sensing portion, such that the reference light is adjusted to be incident to the holographic recording medium along the first incidence direction, and the holographic interferogram is continuously recorded in the holographic recording medium along the servo track.

2. The holographic storage and reproduction system with a servo as claimed in claim 1, further comprising a first light guiding portion and a second light guiding portion, wherein the first light guiding portion is disposed in front of the light source, such that the light generated by the light source is split into the signal light and the reference light after passing through the first light guiding portion, and the first light guiding portion makes the reference light be incident to the holographic recording medium along the first incidence direction, and the second light guiding portion guides the signal light to be incident to the holographic recording medium along the second incidence direction after the signal light is incident to the SLM.

3. The holographic storage and reproduction system with a servo as claimed in claim 2, wherein the first light guiding portion comprises:
   a polarization plate, disposed in front of the light source, for generating a linear polarized light after the light generated by the light source passes through the polarization plate; and
   a beam splitter, for splitting the linear polarized light incident to the beam splitter into the signal light and the reference light, wherein the reference light is incident to the holographic recording medium along the first incidence direction;
   a first phase retardation plate, disposed at one side of the beam splitter, for making a part of the reference light be incident to the first phase retardation plate to change its polarization state; and
   the second light guiding portion comprises:
   a second phase retardation plate, disposed in the signal light path, wherein after the signal light is incident to the SLM, the signal light is incident to the phase retardation plate again, to change its polarization state to be the same as the polarization state of the reference light, thereby generating the holographic interferogram when the part of the reference light and the signal light are overlapped in the holographic recording medium;
   a first polarization beam splitter, for generating the reproduced light when part of the reference light which does not pass through the first phase retardation plate is incident to the holographic interferogram, and making the reproduced light be incident to the second phase retardation plate via lenses and reflective mirror sets to change its polarization state, such that the reproduced light is reflected and diverted when the reproduced light is incident to the first polarization beam splitter; and
   the image sensor, being a two-dimensional image sensor, disposed at one side of the first polarization beam splitter, for receiving the reproduced light reflected and diverted by the first polarization beam splitter.

4. The holographic storage and reproduction system with a servo as claimed in claim 3, wherein the servo light guiding portion comprises:
   a second polarization beam splitter, disposed between the beam splitter and the first phase retardation plate, for making part of the reference light which does not pass through the first phase retardation plate be incident to the first phase retardation plate after being reflected by the holographic recording medium, to change its polarization state, making the part of the reference light be incident to the second polarization beam splitter and be reflected and diverted to be incident to the sensing portion, and making a part of the reference light passing through the first phase retardation plate change its polarization state to be incident to the second polarization beam splitter after being reflected by the holographic recording medium, and be reflected and diverted to be incident to the sensing portion, such that the reference light is converted to a first electrical signal and transmitted to a control device, for analyzing and adjusting the relative distance and oblique angle between the storage and reproduction system and the holographic recording medium; and
   a servo light reflective mirror set, for diverting the servo light to appear as a convergent beam through the objective lens and to be incident to the holographic recording medium, wherein the servo light passes through a wavelength selection film of the holographic recording medium, and is incident to the servo track of the holographic recording medium, the servo light is reflected by the servo track, and then is incident to the sensing portion through the servo light reflective mirror set, to convert the servo light to an electrical signal and transmit the second electrical signal to the control device, such that the reference light is adjusted by the control device to be perpendicularly incident to the holographic recording medium, and the holographic interferogram is recorded in the holographic recording medium along the servo track sequentially.

5. The holographic storage and reproduction system with a servo as claimed in claim 2, wherein the first light guiding portion further comprises:
- a polarization plate, disposed in front of the light source, for generating a linear polarized light after the light generated by the light source passes through the polarization plate; and
- a beam splitter, for splitting the linear polarized light incident to the beam splitter into the signal light and the reference light, wherein the reference light is incident to the holographic recording medium along the first incidence direction; and
- a first phase retardation plate, disposed at one side of the beam splitter, for making a part of the reference light be incident to the first phase retardation plate to change its polarization state; and the second light guiding portion further comprises:
- a second phase retardation plate, disposed in the signal light path, wherein after the signal light is incident to the SLM, the signal light is incident to the second phase retardation plate, to change to the polarization state of the signal light to be the same as the polarization state of the reference light, for generating the holographic interferogram when the part of the reference light and the signal light are overlapped in the holographic recording medium;
- a first polarization beam splitter, disposed in the signal light path, for generating the reproduced light when the part of the reference light which does not pass through the first phase retardation plate is incident to the holographic interferogram, and making the reproduced light be incident to the second phase retardation plate via lenses and reflective mirror sets to change its polarization state, such that the reproduced light is reflected and diverted when the reproduced light is incident to the first polarization beam splitter; and
- the image sensor, being a two-dimensional image sensor, disposed at one side of the first polarization beam splitter, for receiving the reproduced light reflected and diverted by the first polarization beam splitter.

6. The holographic storage and reproduction system with a servo as claimed in claim 5, wherein the servo light guiding portion comprises:
- a second polarization beam splitter, disposed between the beam splitter and the first phase retardation plate, for making the part of the reference light which does not pass through the first phase retardation plate be reflected by the holographic recording medium to change its polarization state, and then be incident to the second polarization beam splitter, and reflected and diverted to be incident to a sensing portion, such that the reference light is converted to a first electrical signal, and transmitted to a control device, for analyzing and adjusting the relative distance and oblique angle between the storage and reproduction system and the holographic recording medium; and
- a dichroic prism, for separating light with different wavelengths, wherein the servo light is incident to the dichroic prism, and reflected and diverted to be incident to the servo track of the holographic recording medium, and after the servo light is modulated by the servo track, the servo light is reflected to be incident to the first phase retardation plate to change its polarization state, and then the servo light is incident to the second polarization beam splitter and reflected and diverted to be incident to the sensing portion, such that the servo light is converted to an electrical signal and transmitted to the control device, the reference light is adjusted by the control device to be incident to the holographic recording medium along the first incidence direction, and the holographic interferogram is recorded in the holographic recording medium along the servo track sequentially.

7. The holographic storage and reproduction system with a servo as claimed in claim 2, wherein the first light guiding portion further comprises:
- a polarization plate, disposed in front of the light source, for generating a linear polarized light after the light generated by the light source passes through the polarization plate;
- a beam splitter, for splitting the linear polarized light incident to the beam splitter into the signal light and the reference light, wherein the reference light is incident to the holographic recording medium along the first incidence direction; and
- a first phase retardation plate, disposed at one side of the beam splitter, for making the reference light be incident to the first phase retardation plate to change its polarization state; and the second light guiding portion further comprises:
- a second phase retardation plate, disposed in the signal light path, wherein after the signal light is incident to the SLM, the signal light is incident to the phase retardation plate, to change its polarization state to be the same as the polarization state of the reference light, and the holographic interferogram is generated when the reference light and the signal light are overlapped in the holographic recording medium;
- a first polarization beam splitter, disposed in the signal light path, for changing the polarization state of the reference light when the reference light passes through the first phase retardation plate, wherein the reference light is incident to a third phase retardation layer and a reflective layer of the holographic recording medium, and is reflected to pass through the third phase retardation layer again, thus when the polarization state of the reference light is changed again and the reference light passes through the holographic interferogram, the reproduced light is generated, and is incident to the second phase retardation plate via lenses and reflective mirror sets to change the polarization state of the reproduced light, such that the reproduced light is reflected and diverted when the reproduced light is incident to the polarization beam splitter; and
- the image sensor, being a two-dimensional image sensor, disposed at one side of the first polarization beam splitter, for receiving the reproduced light reflected and diverted by the first polarization beam splitter.

8. The holographic storage and reproduction system with a servo as claimed in claim 7, wherein the servo light guiding portion comprises:
- a second polarization beam splitter, disposed between the beam splitter and the first phase retardation plate, wherein the reference light passes through a third phase retardation layer of the holographic recording medium, and is reflected by the holographic recording medium to pass through the third phase retardation layer again, such that when the reference light changes its polarization state again and is incident to the second polarization beam splitter, the reference light passes through the first phase retardation plate to change its polarization state again, and is reflected by the second polarization beam splitter to be diverted to be incident to a sensing portion, such that the reference light is converted to a first electrical signal and transmitted to a control device by the sensing portion, for analyzing and adjusting the relative distance and oblique angle between the storage and reproduction system and the holographic recording medium; and a dichroic prism, for separating light with different wavelengths, wherein after the servo light is incident to the dichroic prism and reflected and diverted to be incident to a third phase retardation layer of the holographic recording medium, and the servo light is incident to the servo track of the holographic recording medium, and after being modulated by the servo track, the servo light is reflected to pass through the third phase retardation layer again to change its polarization state, and then be incident to the first phase retardation plate to change its polarization state again, thus the servo light is reflected and diverted to be incident to the sensing portion when the servo light is incident to the second polarization beam splitter, to be converted to a second electrical signal and transmitted to the control device, thereby the reference light is adjusted by the control device to be perpendicularly incident to the holographic recording medium, and the holographic interferogram is recorded in the holographic recording medium along the servo track sequentially.

9. The holographic storage and reproduction system with a servo as claimed in claim 2, wherein the first light guiding portion further comprises:

a polarization plate, disposed in front of the light source, for generating a linear polarized light after the light generated by the light source passes through the polarization plate; and a beam splitter, for splitting the linear polarized light incident to the beam splitter into the signal light and the reference light, wherein the reference light is incident to the holographic recording medium along the first incidence direction; and a first phase retardation plate, disposed at one side of the beam splitter, for making a part of the reference light be incident to the first phase retardation plate to change its polarization state; and the second light guiding portion further comprises:

a second phase retardation plate, disposed in the signal light path, wherein the signal light passes through the second phase retardation plate to change its polarization state to be the same as the polarization state of the reference light, and the signal light is incident to the SLM;

a first polarization beam splitter, wherein when the signal light is reflected and diverted by the SLM to be incident to the first polarization beam splitter, the signal light passes through the first polarization beam splitter and is reflected to be incident to lenses and reflective mirror sets, and then be incident to the holographic recording medium along the second incidence direction, thereby the signal light is made to interfere with the reference light when the signal light and the reference light overlap, and the holographic interferogram is generated in the holographic recording medium;

wherein when the part of the reference light which does not pass through the first phase retardation plate is incident to the holographic interferogram, the reproduced light is generated, and passes through the first polarization beam splitter via the lenses and the reflective mirror sets; and the image sensor, being a two-dimensional image sensor, disposed at one side of the first polarization beam splitter, for receiving the reproduced light passing through the first polarization beam splitter.

10. The holographic storage and reproduction system with a servo as claimed in claim 9, wherein the servo light guiding portion comprises:

a second polarization beam splitter, disposed between the beam splitter and the first phase retardation plate, wherein after the part of the reference light which does not pass through the first phase retardation plate is reflected by the holographic recording medium, the reference light is incident to the first phase retardation plate to change its polarization state, and thus the part of the reference light is incident to the second polarization beam splitter, and reflected and diverted to be incident to a sensing portion, such that the reference light is converted to a first electrical signal and transmitted to a control device, for analyzing and adjusting the relative distance and oblique angle between the storage and reproduction system and the holographic recording medium; and a dichroic prism, for separating light with different wavelengths, wherein the servo light is incident to the dichroic prism, and is reflected and diverted to be incident to the servo track of the holographic recording medium, and after being modulated by the servo track, the servo light is reflected to be incident to the first phase retardation plate to change its polarization state, and then is reflected to be incident to the sensing portion when the servo light is incident to the second polarization beam splitter, to be converted to a second electrical signal and transmitted to the control device, such that the reference light is adjusted by the control device to be perpendicularly incident to the holographic recording medium, and the holographic interferogram is recorded in the holographic recording medium along the servo track sequentially.

11. The holographic storage and reproduction system with a servo as claimed in claim 2, wherein the first light guiding portion further comprises:

a polarization plate, disposed in front of the light source, for generating a linear polarized light after the light generated by the light source passes through the polarization plate; and a beam splitter, for splitting the linear polarized light incident to the beam splitter into the signal light and the reference light, wherein the reference light is incident to the holographic recording medium along the first incidence direction; and a first phase retardation plate, disposed at one side of the beam splitter, for making a part of the reference light be incident to the first phase retardation plate to change its polarization state; and the second light guiding portion further comprises:

a first reflective mirror, for diverting the signal light to be incident to the SLM, wherein the signal light is reflected off the SLM after its polarization state is changed by the SLM;

a first polarization beam splitter, disposed in the signal light path, wherein the signal light reflected by the SLM is incident to the first polarization beam splitter to change its polarization state, then is incident to lenses and reflective mirror sets to be incident to the holographic recording medium along the second incidence direction, such that the polarization state of the signal light is the same as that of the reference light, the signal light and the reference light are overlapped and made to interfere with one another in the holographic recording medium, and the holographic interferogram is generated in the holographic recording medium;

wherein when the part of the reference light which does not pass through the first phase retardation plate is incident to the holographic interferogram, the reproduced light is generated, and penetrates the first polarization beam splitter via the lenses and the reflective mirror sets; and the image sensor, being a two-dimensional image sensor, disposed at one side of the first polarization beam splitter, for receiving the reproduced light penetrating the first polarization beam splitter.

12. The holographic storage and reproduction system with a servo as claimed in claim 11, wherein the servo light guiding portion comprises:

a second polarization beam splitter, disposed between the beam splitter and the first phase retardation plate, wherein the part of the reference light which does not pass through the first phase retardation plate is reflected by the holographic recording medium to change its polarization state, and is then incident to the second polarization beam splitter and reflected and diverted to be incident to a sensing portion, such that the reference light is converted to a first electrical signal and transmitted to a control device, for analyzing and adjusting the relative distance and oblique angle between the storage and reproduction system and the holographic recording medium; and a dichroic prism, for separating lights with different wavelengths, wherein the servo light is incident to the dichroic prism and reflected and diverted to be incident to the servo track of the holographic recording medium, and after being modulated by the servo tracks, the servo light is incident to the first phase retardation plate to change its polarization state, and is reflected and diverted to be incident to the sensing portion when the servo light is incident to the second polarization beam splitter, such that the reference light is converted to a second electrical signal and transmitted to the control device, the reference light is adjusted by the control device to be incident to the holographic recording medium along the first incidence direction, and the holographic interferogram is recorded in the holographic recording medium along the servo track sequentially.

13. The holographic storage and reproduction system with a servo as claimed in claim 2, wherein the first light guiding portion comprises:

a third polarization beam splitter, for splitting the light generated by the light source into the signal light and the reference light wherein the signal light and the reference light have perpendicular polarization states with respect to each other and wherein the reference light is incident to the holographic recording medium along the first incidence direction; and the second light guiding portion comprises:

a fourth phase retardation plate, disposed in the signal light path, such that the polarization state of the signal light is changed to be the same as the polarization state of the reference light, and the signal light is incident to the SLM.

14. The holographic storage and reproduction system with a servo as claimed in claim 13, wherein the first light guiding portion further comprises an objective lens, for making the reference light appear as a convergent beam to be incident to the holographic recording medium.

15. The holographic storage and reproduction system with a servo as claimed in claim 2, wherein the first light guiding portion further comprises:

a third polarization beam splitter, for splitting the light generated by the light source into the signal light and the reference light wherein the signal light and the reference light have perpendicular polarization states with respect to each other and wherein the reference light is incident to the holographic recording medium along the first incidence direction; and a first phase retardation plate, disposed at one side of the third polarization beam splitter, for making a part of reference light be incident to the first phase retardation plate to change its polarization state; and the second light guiding portion further comprises:

a fourth phase retardation plate, disposed in the signal light path, such that the polarization state of the signal light is changed to be the same as the polarization state of the reference light, and the signal light is incident to the SLM;

a second phase retardation plate, disposed in the signal light path, wherein after the signal light is incident to the SLM, the signal light is incident to the second phase retardation plate, to change its polarization state to be the same as the polarization state of the reference light, such that when the part of the reference light and the signal light are overlapped in the holographic recording medium, the holographic interferogram is generated;

a first polarization beam splitter, disposed in the signal light path, wherein when the part of the reference light which does not pass through the first phase retardation plate is incident to the holographic interferogram, the reproduced light is generated, and is incident to the second phase retardation plate via lenses and reflective mirror sets, to change the polarization state of the reproduced light, such that the reproduced light is reflected and diverted when the reproduced light is incident to the first polarization beam splitter; and the image sensor, being a two-dimensional image sensor, disposed at one side of the first polarization beam splitter, for receiving the reproduced light reflected and diverted by the first polarization beam splitter.

16. The holographic storage and reproduction system with a servo as claimed in claim 15, wherein the servo light guiding portion comprises:

a polarization plate, disposed in front of the servo light source, wherein after the servo light emitted by the servo light source passes through the polarization plate, a linear polarized light is generated;

a dichroic prism, for separating light with different wavelengths, wherein the servo light is reflected and diverted by the dichroic prism, a part of the servo light is incident to the first phase retardation plate to change its polarization state, and then is incident to the holographic recording medium, while a part of the servo light is directly incident to the holographic recording medium;

a second polarization beam splitter, disposed between the third polarization beam splitter and the first phase retardation plate, wherein the part of the reference light which does not pass through the first phase retardation plate is reflected by the holographic recording medium, and is incident to the first phase retardation plate to change its polarization state, and then is incident to the second polarization beam splitter to be reflected and diverted, while the part of the servo light which is directly incident to the holographic recording medium is incident to the holographic recording medium, and then is reflected to be incident to the first phase retardation plate to change its polarization state, and then is reflected and diverted when the servo light is incident to the second polarization beam splitter; and a secondary dichroic prism, wherein after the servo light is reflected by the second polarization beam splitter, the servo light is incident to the secondary dichroic prism to be reflected and diverted towards a sensing portion, such that the servo light is converted to a second electrical signal and propagated to a control device, the reference light is adjusted by the control device to be perpendicularly incident to the holographic recording medium, and the holographic interferogram is recorded in the holographic recording medium along the servo track sequentially, the reference light passes through the dichroic prism to be incident to the sensing portion, such that the reference light is converted to a first electrical signal and transmitted to a control device, for analyzing and adjusting the relative distance and oblique angle between the storage and reproduction system and the holographic recording medium.

17. The holographic storage and reproduction system with a servo as claimed in claim 1, wherein the SLM is a transmissive SLM.

18. The holographic storage and reproduction system with a servo as claimed in claim 1, wherein the SLM is a reflective SLM.

* * * * *